United States Patent
Berelejis et al.

(10) Patent No.: US 9,628,691 B2
(45) Date of Patent: Apr. 18, 2017

(54) METHOD AND APPARATUS FOR IDENTIFYING A PHYSICAL IOT DEVICE

(71) Applicant: QUALCOMM Incorporated, San Diego, CA (US)

(72) Inventors: Gabriel Berelejis, Mevaseret Zion (IL); Doron Zehavi, Kibbutz Tzora (IL); Eyal David Ilsar, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 14/539,302

(22) Filed: Nov. 12, 2014

(65) Prior Publication Data
US 2015/0130957 A1    May 14, 2015

Related U.S. Application Data

(60) Provisional application No. 61/904,338, filed on Nov. 14, 2013.

(51) Int. Cl.
*H04N 5/232* (2006.01)
*H04L 29/08* (2006.01)
*H04L 12/28* (2006.01)

(52) U.S. Cl.
CPC ..... *H04N 5/23206* (2013.01); *H04L 12/2807* (2013.01); *H04L 67/12* (2013.01)

(58) Field of Classification Search
CPC ............................ H04N 5/23206; H04L 67/12
See application file for complete search history.

(56) References Cited

U.S. PATENT DOCUMENTS

| 8,554,250 B2 | 10/2013 | Linaker |
| 2008/0194270 A1* | 8/2008 | Greenberg ........ G06F 17/30265 455/456.1 |
| 2010/0228767 A1 | 9/2010 | Slinker et al. |
| 2010/0311347 A1 | 12/2010 | Le Thierry D'ennequin et al. |
| 2010/0317332 A1 | 12/2010 | Bathiche et al. |
| 2012/0151034 A1 | 6/2012 | Wohlert et al. |
| 2013/0187953 A1 | 7/2013 | Matsumura et al. |

(Continued)

FOREIGN PATENT DOCUMENTS

CN         202503604 U       10/2012

OTHER PUBLICATIONS

S. Mayer et. al., Device Recognition for Intuitive Interaction with the Web of Things, UbiComp'13, Sep. 8-12, 2013.*

(Continued)

*Primary Examiner* — Twyler Haskins
*Assistant Examiner* — Angel L Garces-Rivera
(74) *Attorney, Agent, or Firm* — Muncy, Geissler, Olds & Lowe, P.C.

(57) ABSTRACT

The disclosure is related to identifying an Internet of Things (IoT) device with an image of the IoT device. A user device captures the image of the IoT device, wherein the image of the IoT device includes at least a portion of an environment around the IoT device, and transmits the image from the user device to the IoT device, wherein the IoT device associates the image with information identifying the IoT device. The IoT device receives the image of the IoT device from the user device, stores the image of the IoT device, and associates the image of the IoT device with information identifying the IoT device.

30 Claims, 20 Drawing Sheets

(56) References Cited

U.S. PATENT DOCUMENTS

2014/0211024 A1 7/2014 Hiramatsu
2014/0244001 A1 8/2014 Glickfield et al.

OTHER PUBLICATIONS

International Search Report and Written Opinion—PCT/US2014/065556—ISA/EPO—Apr. 1, 2015.
Guo B., et al., "From the internet of things to embedded intelligence," 2012, pp. 1-29.
Quack T., et al., "Object recognition for the internet of things," Proceedings of the 1st international conference on the internet of things, 2008, pp. 230-246.

* cited by examiner

METHOD AND APPARATUS FOR IDENTIFYING A PHYSICAL IOT DEVICE

CROSS-REFERENCE TO RELATED APPLICATIONS

The present application for patent claims the benefit of Provisional Application No. 61/904,338, entitled "METHOD AND APPARATUS FOR IDENTIFYING A PHYSICAL IOT DEVICE," filed Nov. 14, 2013, which is assigned to the assignee hereof and hereby expressly incorporated by reference herein in its entirety.

TECHNICAL FIELD

The disclosure is related to identifying a physical IoT device.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

The disclosure is related to identifying an Internet of Things (IoT) device with an image of the IoT device. A method for identifying an IoT device with an image of the IoT device includes capturing, by a user device, the image of the IoT device, wherein the image of the IoT device includes at least a portion of an environment around the IoT device, and transmitting the image from the user device to the IoT device, wherein the IoT device associates the image with information identifying the IoT device.

A method for identifying an IoT device with an image of the IoT device includes receiving, by the IoT device, the image of the IoT device from a user device, wherein the image of the IoT device includes at least a portion of an environment around the IoT device, storing the image of the IoT device, and associating the image of the IoT device with information identifying the IoT device.

An apparatus for identifying an IoT device with an image of the IoT device includes logic configured to capture, by a user device, the image of the IoT device, wherein the image of the IoT device includes at least a portion of an environment around the IoT device, and logic configured to transmit the image from the user device to the IoT device, wherein the IoT device associates the image with information identifying the IoT device.

An apparatus for identifying an IoT device with an image of the IoT device includes logic configured to receive, by the IoT device, the image of the IoT device from a user device, wherein the image of the IoT device includes at least a portion of an environment around the IoT device, logic configured to store the image of the IoT device, and logic configured to associate the image of the IoT device with information identifying the IoT device.

An apparatus for identifying an IoT device with an image of the IoT device includes means for capturing, by a user device, the image of the IoT device, wherein the image of the IoT device includes at least a portion of an environment around the IoT device, and means for transmitting the image from the user device to the IoT device, wherein the IoT device associates the image with information identifying the IoT device.

An apparatus for identifying an IoT device with an image of the IoT device includes means for receiving, by the IoT device, the image of the IoT device from a user device, wherein the image of the IoT device includes at least a portion of an environment around the IoT device, means for storing the image of the IoT device, and means for associating the image of the IoT device with information identifying the IoT device.

A non-transitory computer-readable medium for identifying an IoT device with an image of the IoT device includes at least one instruction to capture, by a user device, the image of the IoT device, wherein the image of the IoT device includes at least a portion of an environment around the IoT device, and at least one instruction to transmit the image from the user device to the IoT device, wherein the IoT device associates the image with information identifying the IoT device.

A non-transitory computer-readable medium for identifying an IoT device with an image of the IoT device includes at least one instruction to receive, by the IoT device, the image of the IoT device from a user device, wherein the image of the IoT device includes at least a portion of an environment around the IoT device, at least one instruction to store the image of the IoT device, and at least one instruction to associate the image of the IoT device with information identifying the IoT device.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
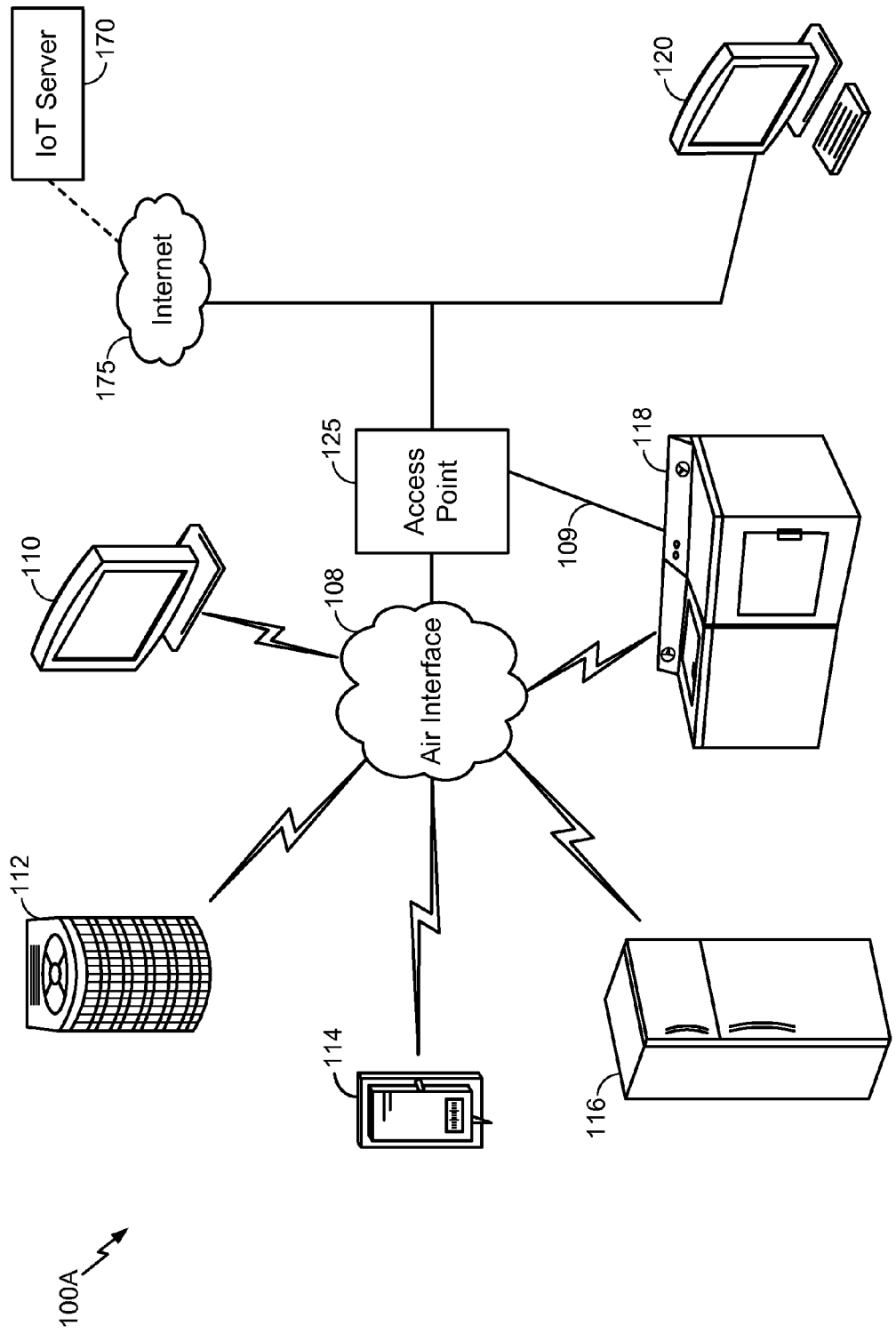
FIG. 1A illustrates a high-level system architecture of a wireless communications system in accordance with an aspect of the disclosure.

The disclosure is related to identifying an Internet of Things (IoT) device with an image of the IoT device. A user device captures the image of the IoT device, wherein the image of the IoT device includes at least a portion of an environment around the IoT device, and transmits the image from the user device to the IoT device, wherein the IoT device associates the image with information identifying the IoT device. The IoT device receives the image of the IoT device from the user device, stores the image of the IoT device, and associates the image of the IoT device with information identifying the IoT device.

These and other aspects are disclosed in the following description and related drawings to show specific examples relating to exemplary embodiments of a identifying a physical IoT device. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of inter-connected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
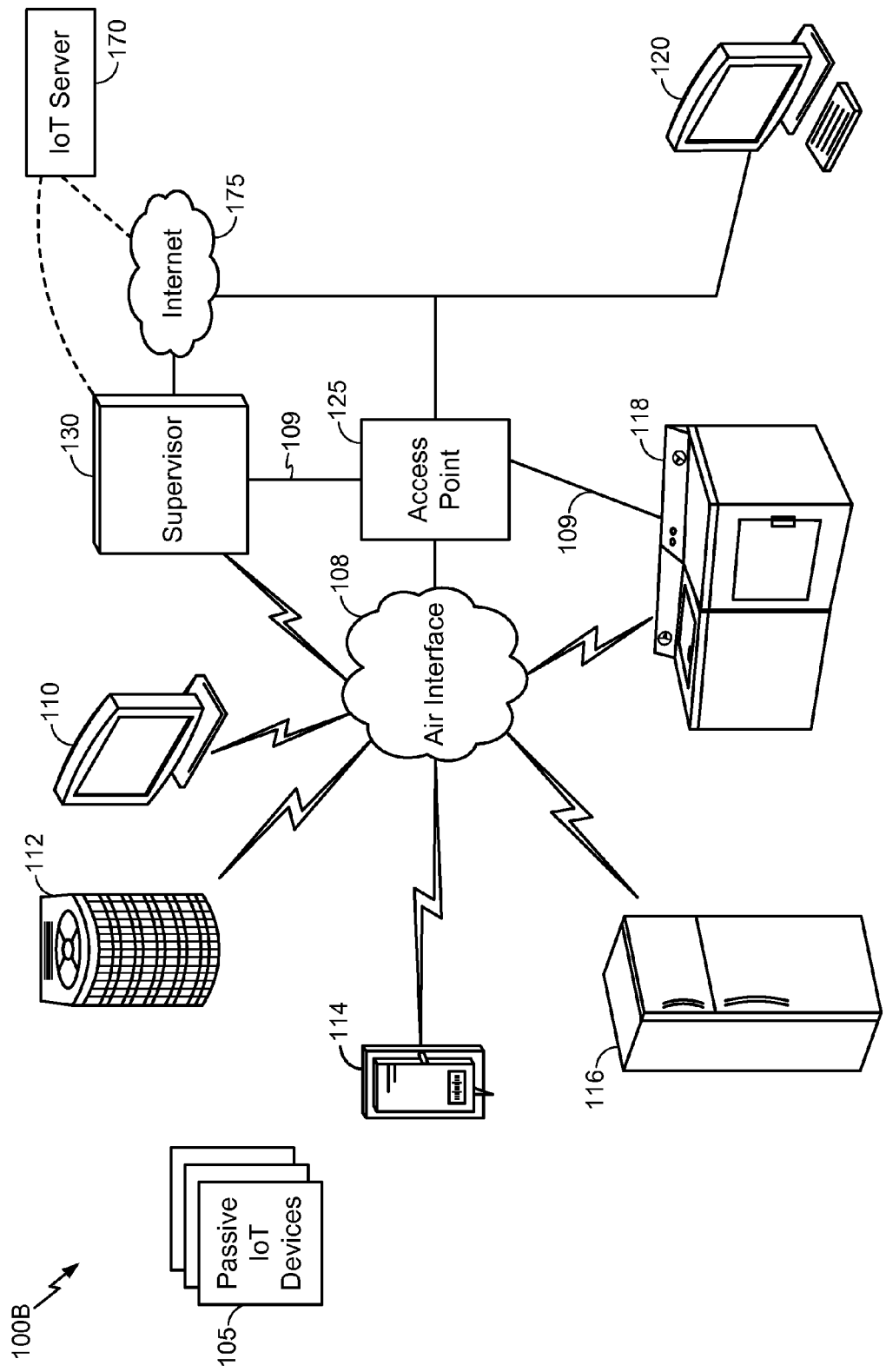
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
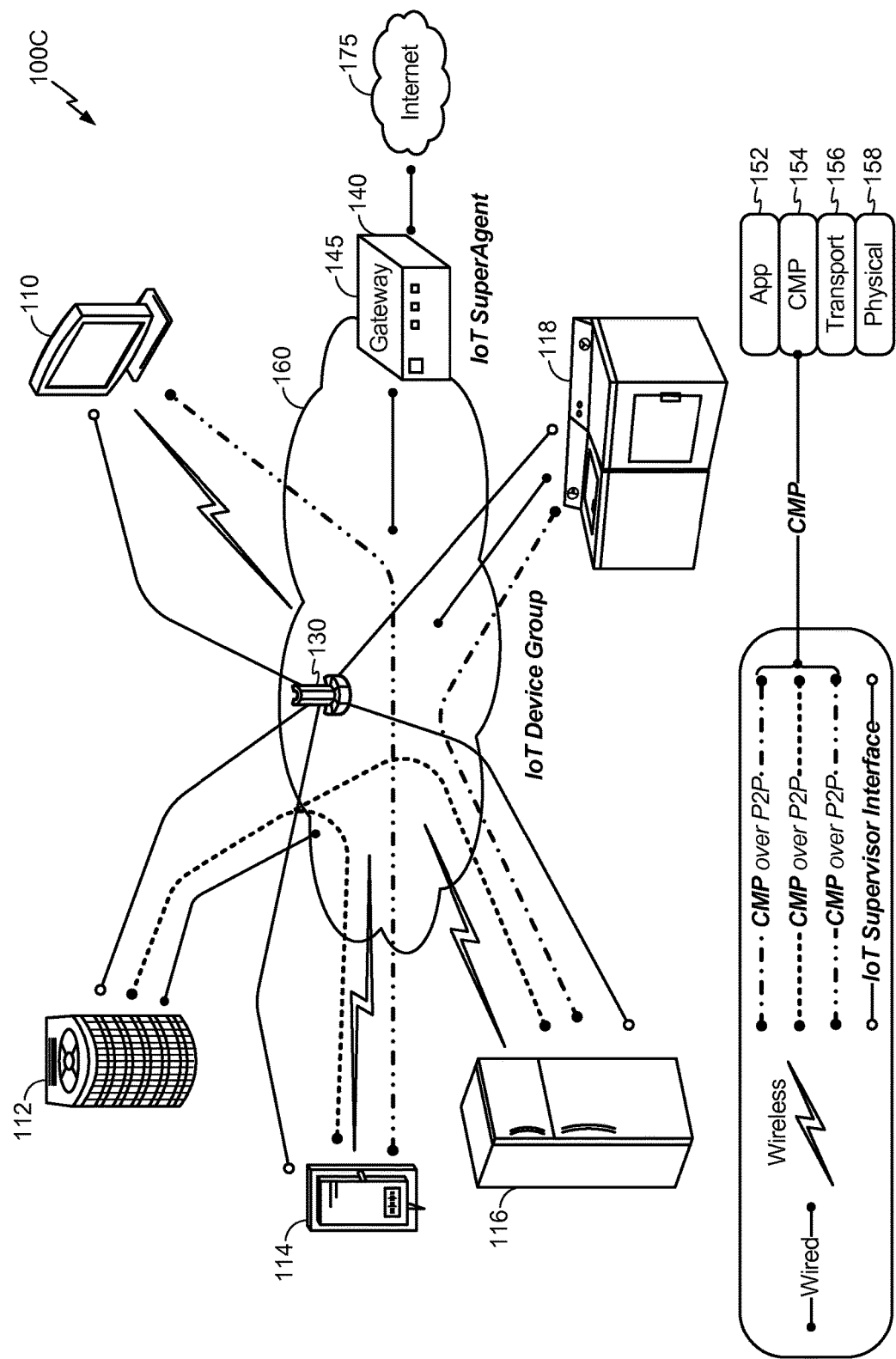
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peerto-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
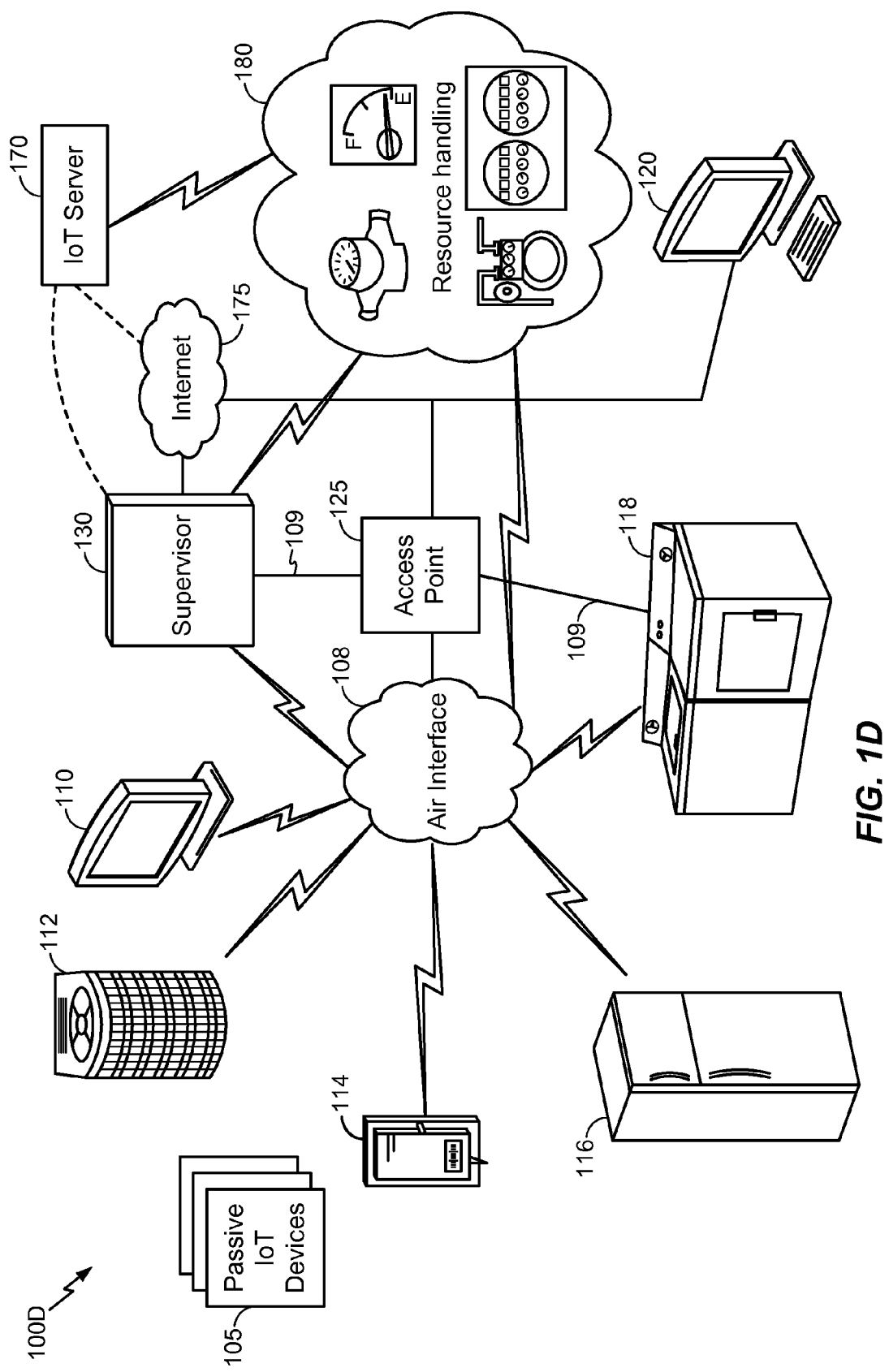
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
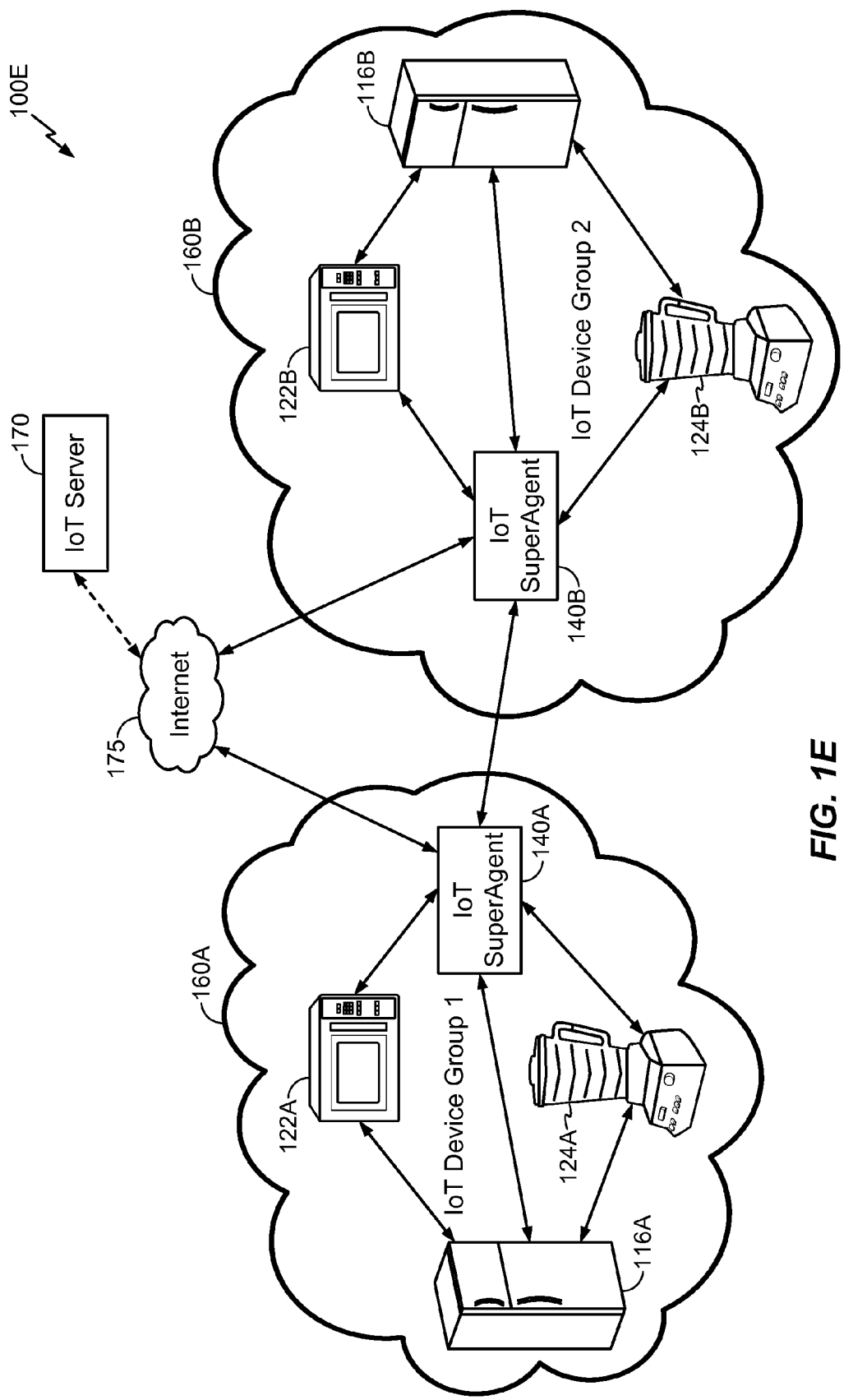
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
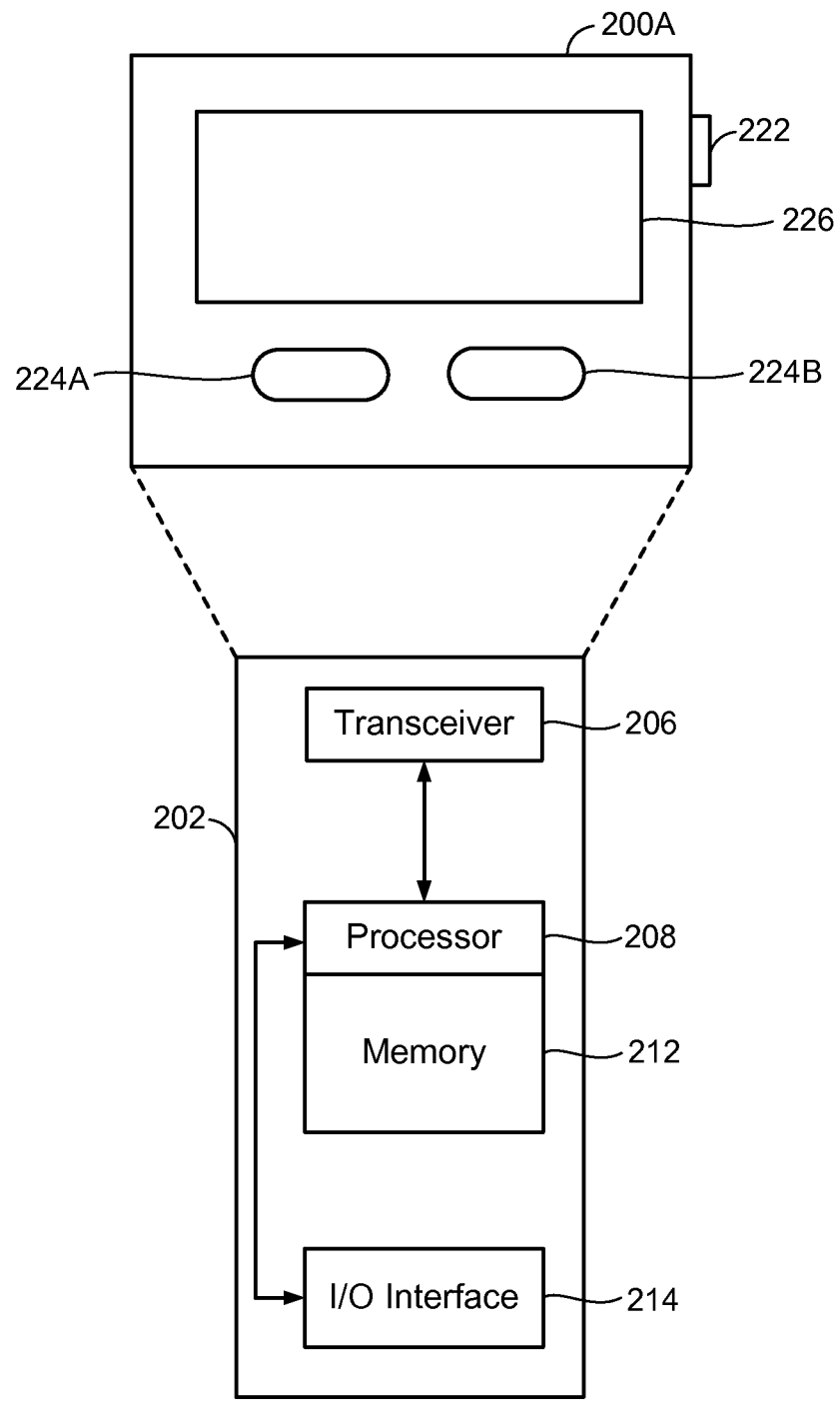

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A. The platform 202 may also optionally include a camera 210, which may be a camera device integrated into IoT device 200A and/or a camera application configured to allow a user to operate the camera device.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

For example, where the IoT device 200A is configured to identify an IoT device with an image of the IoT device as described herein, the camera 210 (when present) may be configured to capture the image of the IoT device and the transceiver 206 may be configured to transmit the image from the IoT device 200A to the other IoT device. Alternatively, if the IoT device 200A is not equipped with a camera 210, the transceiver 206 may be configured to receive the image of the IoT device from another device that is equipped with a camera. As another example, where the IoT device 200A is configured to be identified with an image of the IoT device 200A, the transceiver 206 may be configured to receive the image of the IoT device 200A from another user device, the memory 212 may be configured to store the image of the IoT device 200A, and the processor 208 and/or the memory 212 may be configured to associate the image of the IoT device 200A with information identifying the IoT device 200A.

Figure 2B:
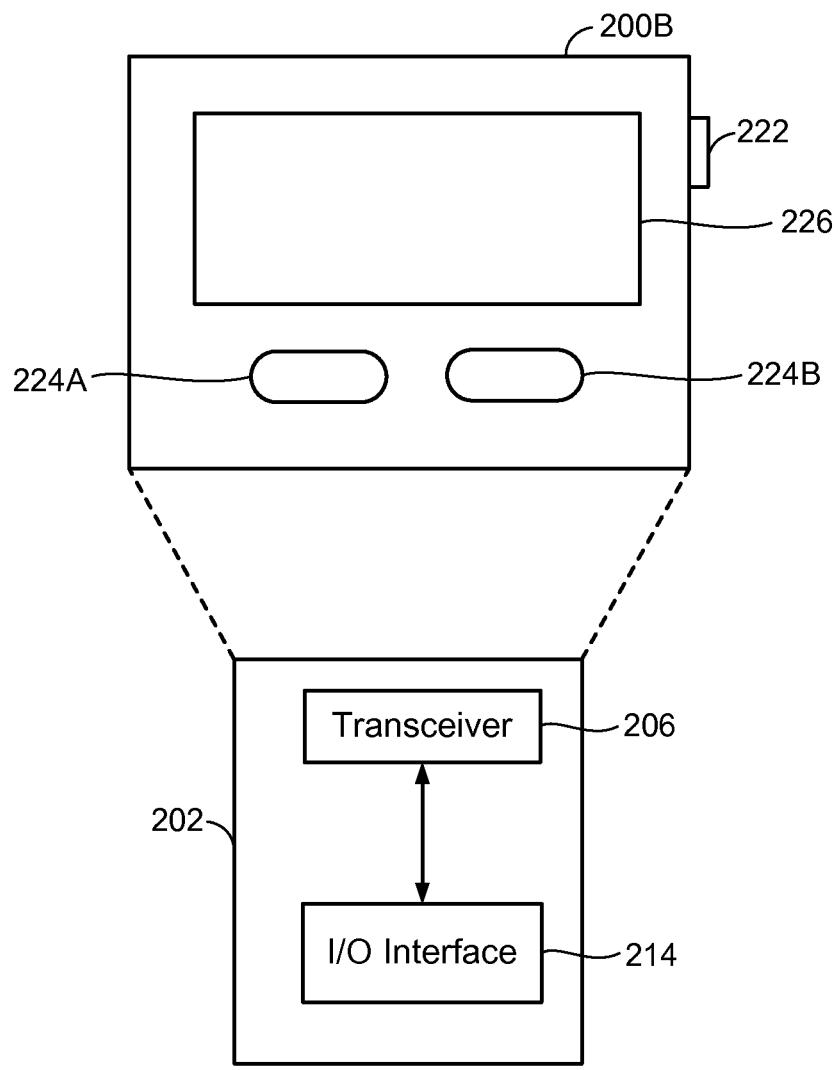
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

In an aspect, the IoT device 200B may be configured to be identified with an image of the IoT device 200B, as described herein. In that case, the transceiver 206 may be configured to receive the image of the IoT device 200B from another user device, such as IoT device 200A, a memory (not shown) may be configured to store the image of the IoT device 200B, and a processor and/or the memory (not shown) may be configured to associate the image of the IoT device 200B with information identifying the IoT device 200B.

Figure 3:
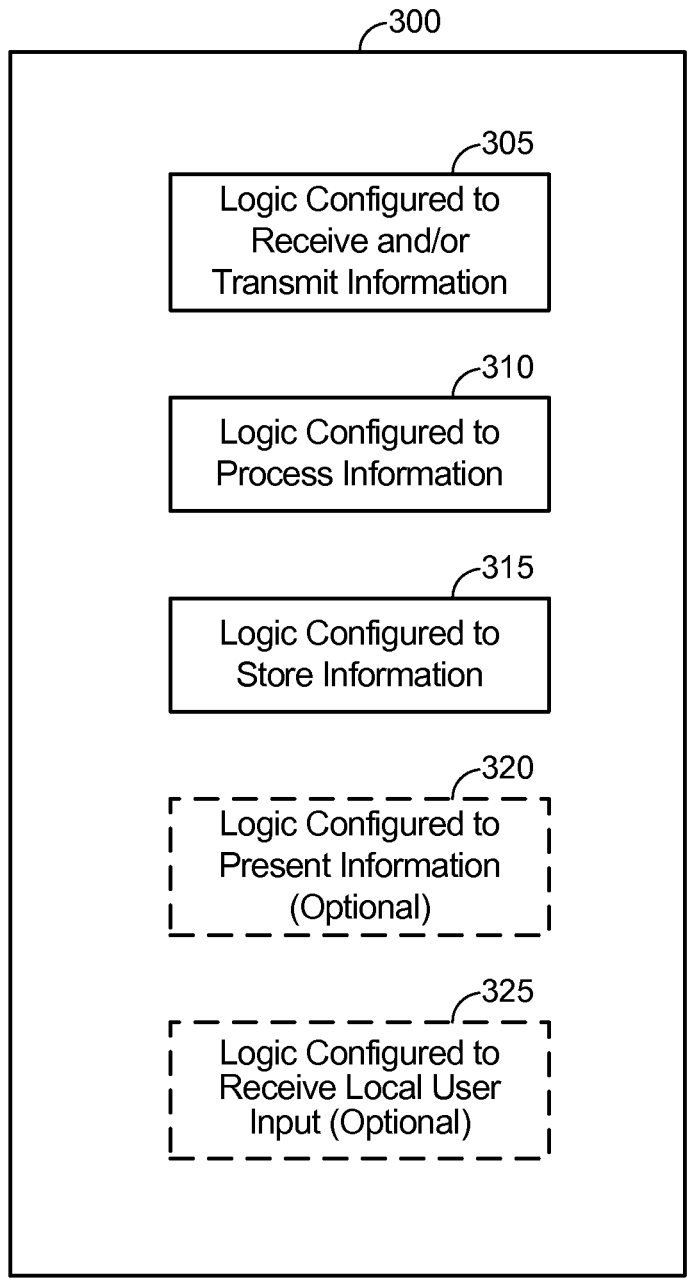
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
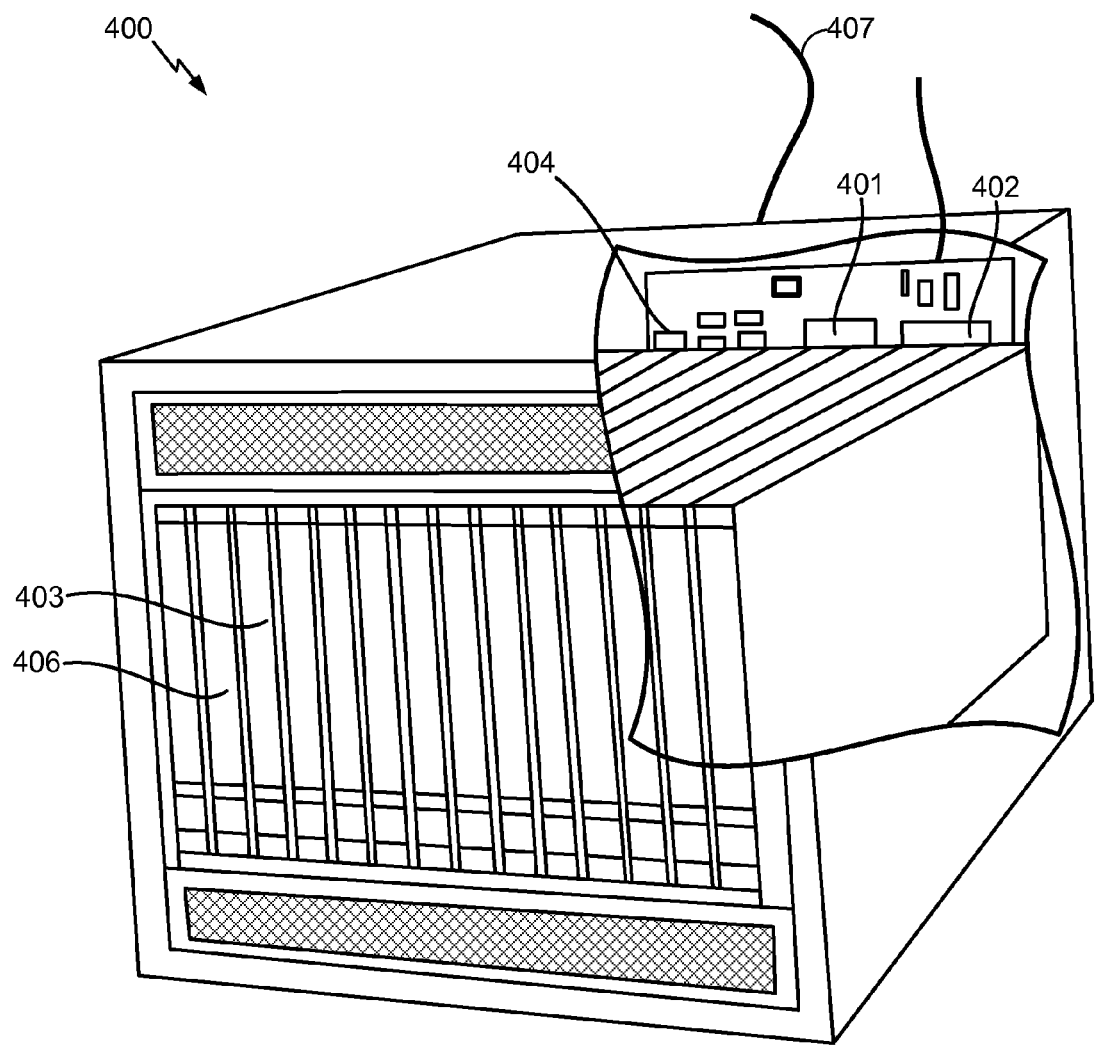
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
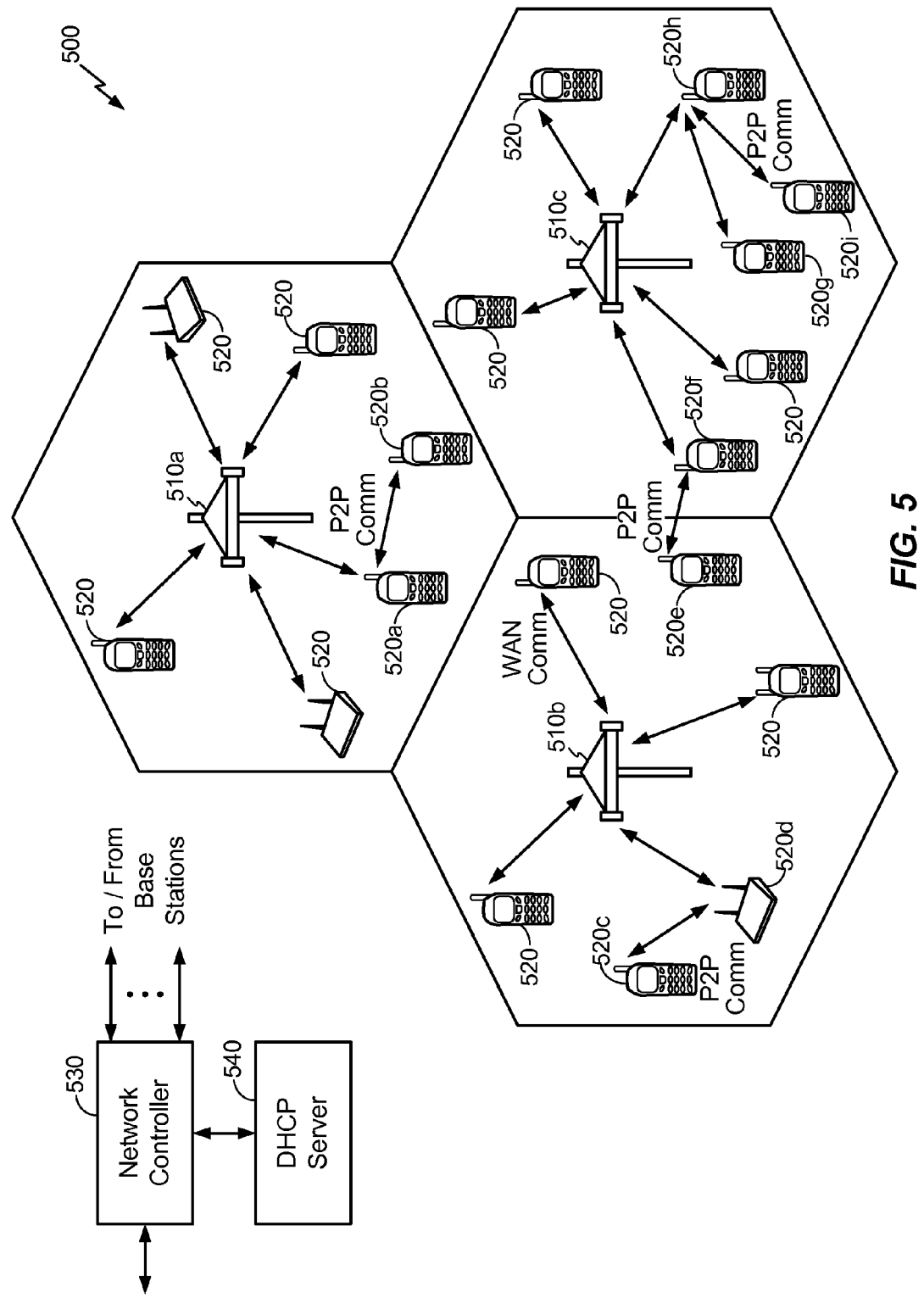
FIG. 5 illustrates a wireless communication network that may support discoverable peer-to-peer (P2P) services, in accordance with one aspect of the disclosure.

In general, user equipment (UE) such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
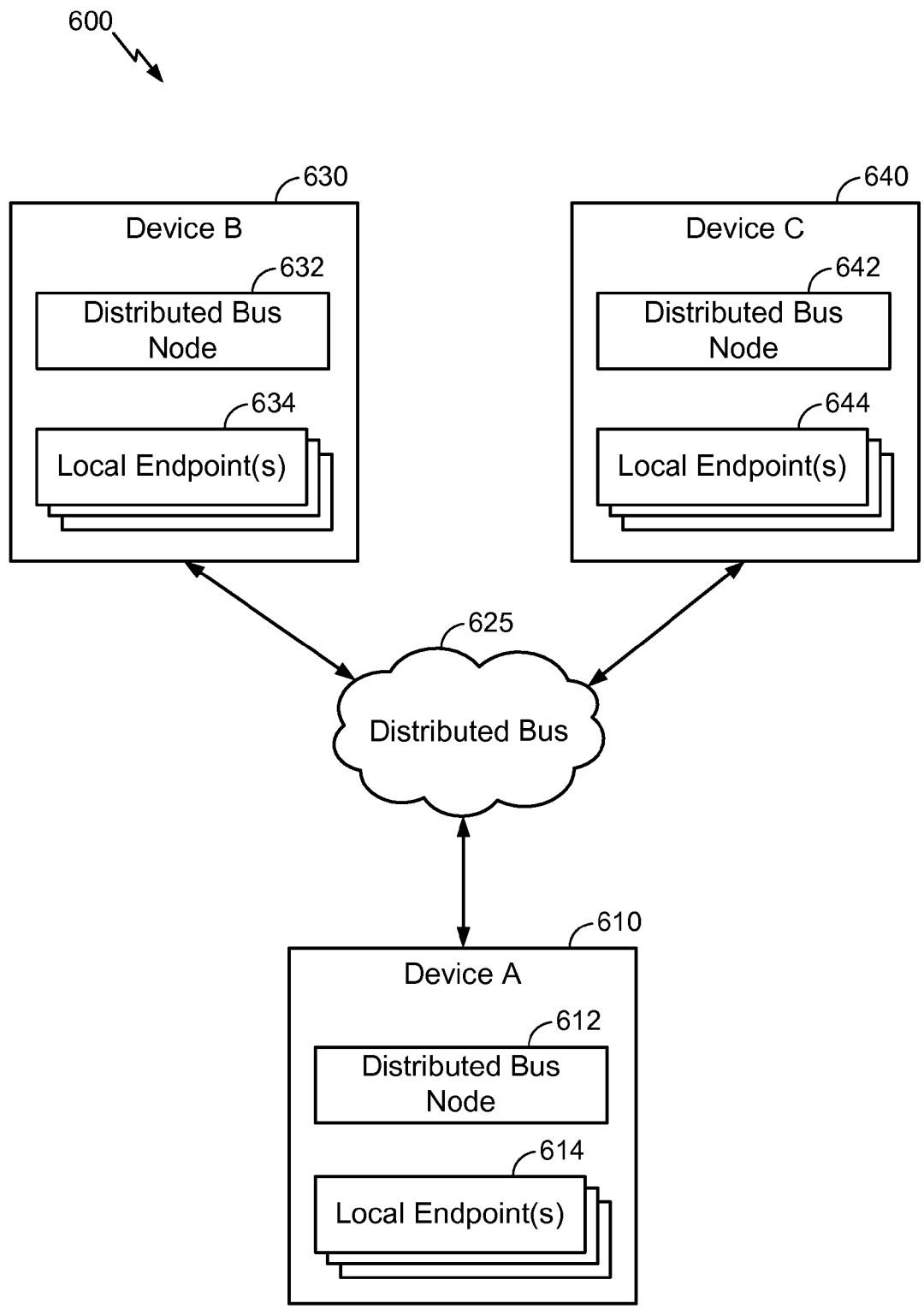
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
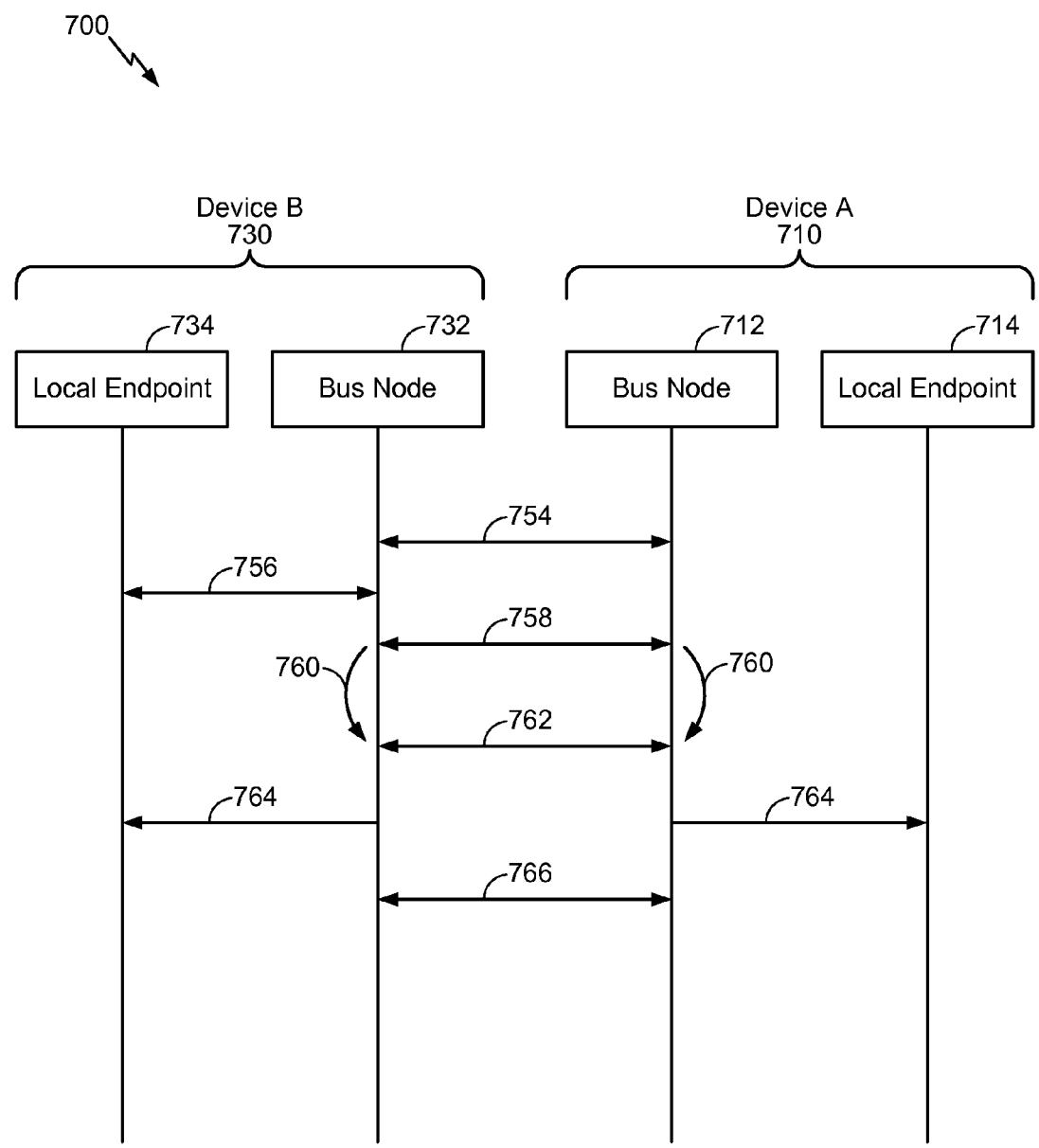
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc, available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

Figure 8:
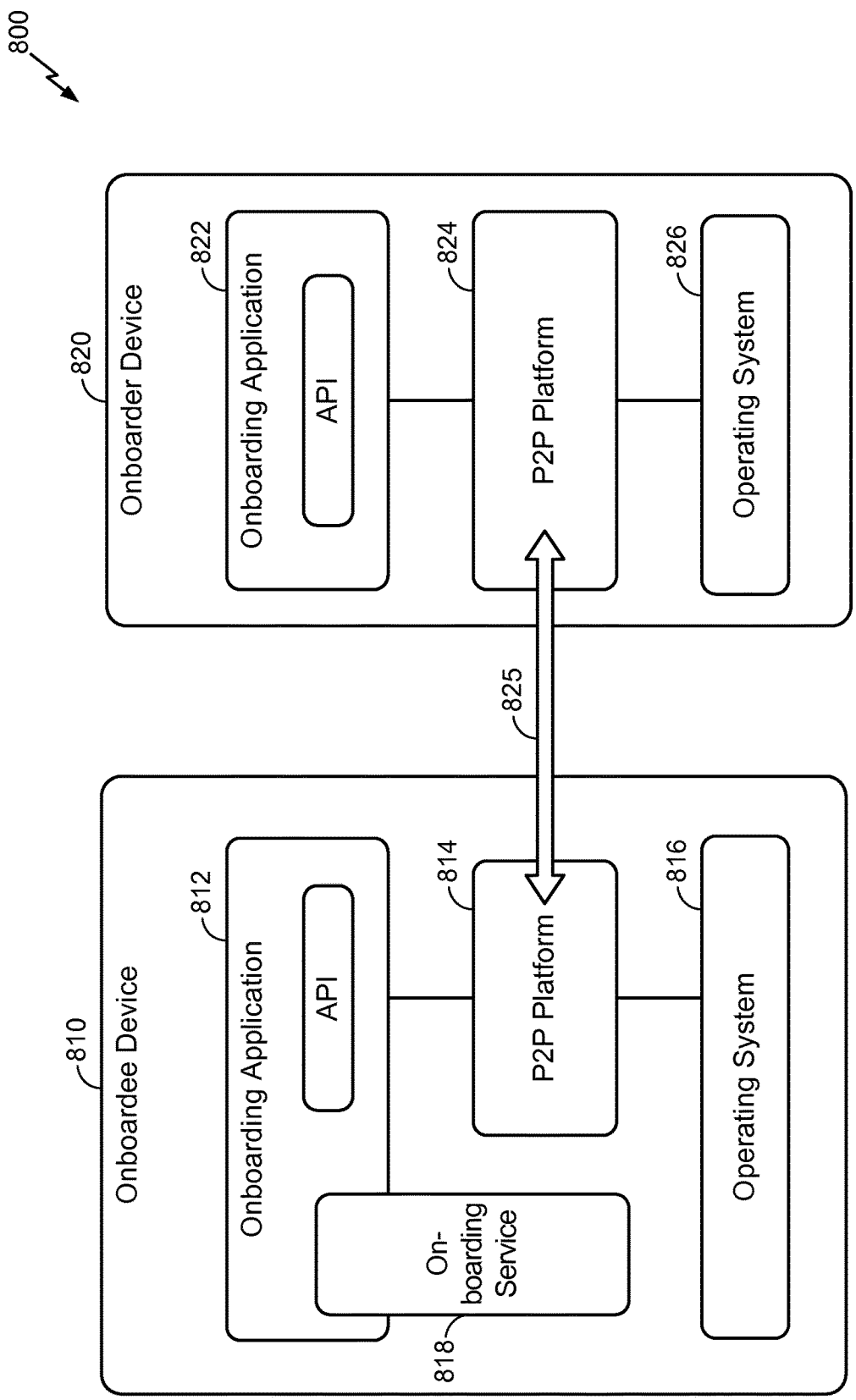
FIG. 8 illustrates an exemplary system architecture in which discoverable P2P services may be used to allow remote onboarding of a headless devices over a Wi-Fi network, in accordance with one aspect of the disclosure.

According to one aspect of the disclosure, FIG. 8 illustrates an exemplary system architecture 800 in which discoverable P2P services used over a Wi-Fi network may allow remote onboarding of headless devices (e.g., a computer system or device that has been configured to operate without a monitor, keyboard, and mouse, and which can be controlled via a network connection). As shown in FIG. 8, the system architecture 800 may include an onboardee device 810 attempting to associate and authenticate to a personal access point (AP) and thereby join the Wi-Fi network, wherein the onboardee device 810 may correspond to a new device that has not previously been configured to access the Wi-Fi network or a device that was previously configured to access the Wi-Fi network and subsequently offboarded (e.g., to reset the device to factory-default settings or otherwise change a configuration state associated with the device, to change a configuration state associated with the Wi-Fi network, etc.). Furthermore, the system architecture 800 may include an onboarder device 820 that been configured and validated on the Wi-Fi network and uses the discoverable P2P services to remotely onboard the onboardee device 810 to the Wi-Fi network.

In one embodiment, the onboardee device 810 and the onboarder device 820 may run respective onboarding applications 812, 822 that communicate with respective P2P platforms 814 that provide the discoverable P2P services that may facilitate the remote onboarding (e.g., the AllJoyn™ software framework mentioned above). As such, the onboardee device 810 and the onboarder device 820 may communicate with one another using the mechanisms described in further detail above to form a distributed bus 825 that may enable communication between the respective onboarding applications 812, 822, which may correspond to the local endpoints described above in connection with FIGS. 6-7. Furthermore, in one embodiment, the onboardee device 810 and the onboarder device 820 may run respective operating systems 816, 826 that run a host "daemon" bus process to handle message routing between the onboardee device 810 and the onboarder device 820. For example, in one embodiment, the respective onboarding applications 812, 822 may communicate with the respective host daemons running on the onboardee device 810 and the onboarder device 820, wherein the respective host daemons may implement local segments of the distributed bus 825 and coordinate message flows across the distributed bus 825. In this configuration, the onboarding application 812 can make remote method calls to an onboarding service 818 that facilitates certain processes to configure and validate the onboardee device 810 in order to access the Wi-Fi network, as will be described in further detail herein. In this manner, the onboarding application 812 can communicate with the onboarding service 818 as though the onboarding service 818 were a local object, wherein parameters may be marshaled at the source and routed off of the local bus segment by the local host daemon and then transparently sent over a network link to the local host daemon on the onboarder device 820. The daemon running on the onboarder device 820 may then determine that the destination is the local onboarding application 822 and arrange to have the parameters unmarshaled and the remote method invoked on the local onboarding application 822.

As such, the daemons may generally run in one or more background processes and the onboarding applications 812, 822 and the onboarding service 818 may run in separate processes, whereby the onboarding applications 812, 822 and the onboarding service 818 may have respective local "bus attachments" that represent the local host daemon and handle message routing therebetween. Alternatively, in certain cases, the onboardee device 810 may be a thin client, an embedded device, or another device that has a constrained operating environment (e.g., limited size, memory, processor speed, power, peripherals, user interfaces, etc.). As such, where the onboardee device 810 has limited capabilities, bundling local bus attachments into each application or service that uses the P2P platform 814 may interfere with performance (e.g., because substantial bus attachments may require substantial network connections, memory, etc.). In these cases, rather than having a local bus attachment within the onboarding application 812 and/or the onboarding service 818, the onboarding application 812 may instead employ a thin client application program interface and the P2P platform 814 may instead employ a thin client process that utilizes the host daemon on the onboardee device 810 running the onboarding application 812. However, in either case, the call flows and behavior that occur between the onboardee device 810 and the onboarder device 820 to configure and validate the onboardee device 810 in order to access the Wi-Fi network may be substantially the same whether the onboarding application 812 implements a local bus attachment to communicate with the host daemon or communicates directly with the host daemon.

Having provided the above overview relating to the system architecture 800 in which discoverable P2P services may be used to allow remote onboarding of the onboardee device 810 over a Wi-Fi network, various aspects that relate to the specific mechanisms that may be used to allow remote onboarding over a Wi-Fi network via discoverable P2P services will now be described.

More particularly, when a device is powered, the device may typically either enter an "onboarding" mode or a "connected" mode according to a configuration state associated therewith. In either the onboarding mode or the connected mode, the device may wait for other peer devices to connect to the device and provide network configuration credentials and configuration information. Furthermore, in the onboarding mode, the device may become a Wi-Fi access point (AP) and await Wi-Fi clients to connect thereto. For example, in one embodiment, the device in the onboarding mode may enter a Software-enabled Access Point (SoftAP) mode in which a wireless client antenna may work as both the access point and the client (e.g., software on the device may create a wireless or portable hotspot that other wireless devices in the vicinity can use, whereby cellular telephones or other devices with a client antenna and a data connection can act as an access point to serve other wireless devices in the vicinity that may otherwise lack a data connection). Alternatively, in the connected mode, the device may connect to a wireless network for which the device has already been configured. In either the onboarding mode or the connected mode, the device may generally wait for other peer devices to connect thereto and provide appropriate network configuration and credential information.

Figure 9A:
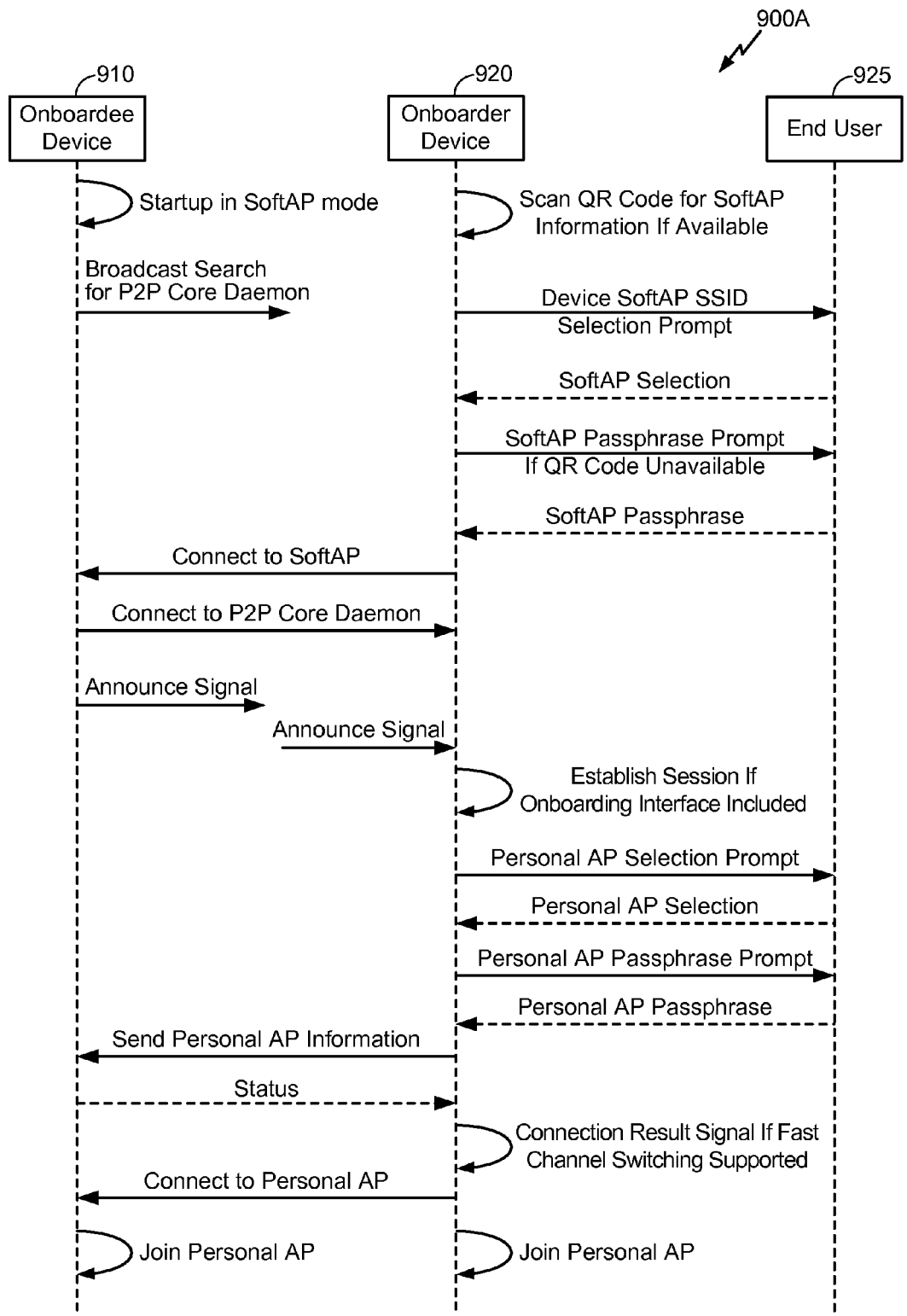
FIGS. 9A-B illustrate exemplary message sequences in which discoverable P2P services may be used to allow remote onboarding of headless devices over a Wi-Fi network, in accordance with one aspect of the disclosure.

Accordingly, as will be described in further detail herein, FIG. 9A illustrates an exemplary message sequence 900A in which discoverable P2P services may be used to allow remote onboarding of headless devices over a Wi-Fi network. For example, in one embodiment, the message sequence 900A shown in FIG. 9A may occur between an onboardee device 910 attempting to join a personal Wi-Fi network and an onboarder device 920 that may remotely onboard the onboardee device 910 to the personal Wi-Fi network. In particular, the onboardee device 910 and/or the onboarder device 920 may correspond to smart devices that may execute applications running P2P clients, wherein the onboardee device 910 may startup in the SoftAP (or "onboarding" mode) and perform a broadcast search for a core daemon associated with the discoverable P2P services. If available, the onboarder device 920 may scan a quick response (QR) code to obtain information associated with the SoftAP that corresponds to the onboardee device 910. Alternatively, the onboarder device 920 may scan for devices in the SoftAP (or onboarding) mode and prompt an end user 925 to select a SoftAP Service Set Identifier (SSID) from a list that includes any devices that were found in the scan. For example, the SoftAP SSID associated with the onboardee device 910 may be found in response to discovering the broadcast search transmitted by the onboardee device 910. In the latter case, where the QR code was unavailable or the SoftAP information otherwise could not be obtained therefrom, the message sequence 900A may further include receiving a SoftAP selection from the end user 925, wherein the application running on the onboarder device 920 may then prompt the end user 925 to provide a passphrase associated with the SoftAP corresponding to the onboardee device 910. The onboarder device 920 may then connect to the SoftAP corresponding to the onboardee device 910 and the onboardee device 910 may in turn connect to the core P2P daemon running on the onboarder device 920.

The onboardee device 910 may then transmit a public announcement signal, which may be detected at the onboarder device 920. In one embodiment, if the onboarder device 920 has an appropriate onboarding interface, the onboarder device 920 may establish a session with the onboardee device 910 and engage with the services associated therewith. During the engagement, a secured connection may be established based on a key exchange algorithm in which a shared symmetric key may be generated using shared evidence. For example, the first time that the onboardee device 910 and the onboarder device 920 attempt to engage with one another, the shared evidence may correspond to well-known evidence (e.g., a default passcode for the onboarding interface, which may be configured as part of factory settings during an original equipment manufacturing process). Subsequently, an appropriate service method may be called to immediately alter the well-known or default evidence to a shared secret (e.g., a custom password established by the end user 925). In response to suitably establishing the secured connection, the onboarder device 920 may then call an appropriate service method to transfer configuration information associated with the personal Wi-Fi network to the onboardee device 910. For example, in one embodiment, the configuration information transferred from the onboarder device 920 to the onboardee device 910 may comprise an SSID, a passphrase or other authentication credentials, and/or an authentication type associated with a personal access point (AP) on the personal Wi-Fi network. In one embodiment, the onboardee device 910 may then return a status signal to the onboarder device 920 to indicate whether the personal AP configuration information has been received and appropriately set, and the onboarder device 920 may then instruct the onboardee device 910 to connect to the personal AP. In one embodiment, in response to the onboardee device 910 successfully joining the personal AP, the onboardee device 910 may then call an appropriate service method to leave the onboarding mode. Furthermore, the same mechanisms can be used when the onboardee device 910 operates in the connected mode (i.e., has already been "onboarded"). For example, the onboardee device 910 may be connected to the same Wi-Fi network as the onboarder device 920 and discover and engage with the P2P services running thereon, whereby the onboarder device 920 may remotely modify the network configuration associated with the onboardee device 910 and thereby cause the onboardee device 910 to shift to a different network. Further still, if the onboardee device 910 supports fast channel switching, the onboarder device 920 may receive a connection result signal when the onboardee device 910 completes the connection attempt against the personal AP, wherein the connection result signal may be sent over the SoftAP link and include an appropriate value to indicate the result from the connection attempt (e.g., validated, unreachable, unsupported protocol, unauthorized, error, etc.).

Figure 9B:
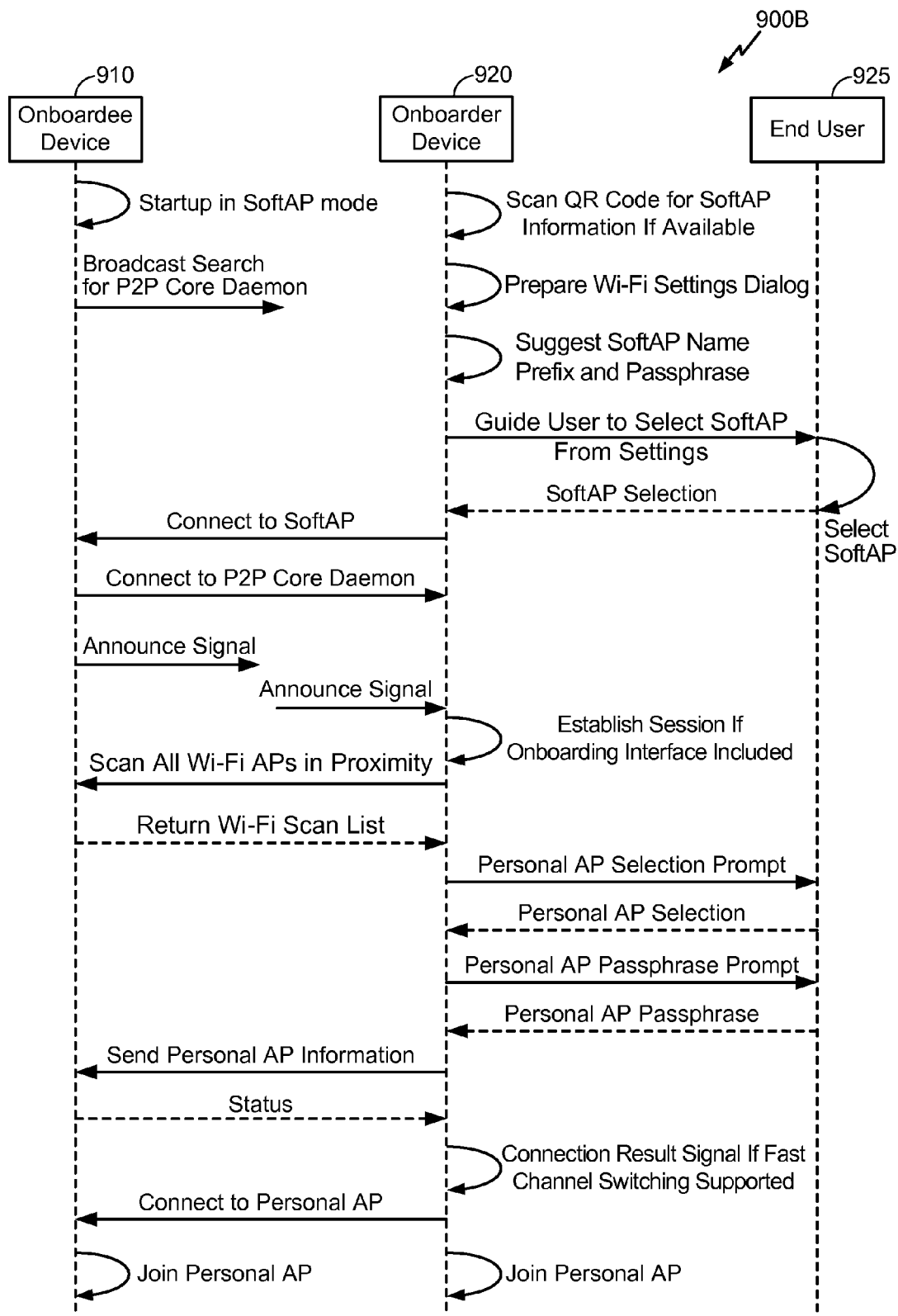

According to one aspect of the disclosure, FIG. 9B illustrates another exemplary message sequence 900B in which discoverable P2P services may be used to allow remote onboarding of headless devices over a Wi-Fi network. In particular, certain devices may run operating systems or other platforms that lack support to initiate Wi-Fi scans programmatically via an application program interface (API), in which case certain operations shown in FIG. 9A may not be supported. For example, an appropriately configured API can be used to programmatically initiate a Wi-Fi scan on the Android operating system, whereas programmatically initiating a Wi-Fi scan may be unsupported on other operating systems such as iOS. As such, in one exemplary use case, an onboarder device 920 running the Android operating system may use the message sequence shown in FIG. 9A, while an onboarder device 920 running the iOS operating system may use the message sequence shown in FIG. 9B. In general, the message sequences 900A and 900B may be substantially similar. However, rather than prompting the end user 925 to select the SoftAP SSID from a scan list and supply the SoftAP passphrase, message sequence 900B may prepare a dialog regarding a Wi-Fi settings screen or other user interface that the onboarder device 920 employs to choose a Wi-Fi network (e.g., because the appropriate SoftAP SSID cannot be obtained through a programmatically initiated Wi-Fi scan). Additionally, the onboarder device 920 may include a facility to suggest a name prefix and passphrase associated with the SoftAP and guide the end user 925 to select the SoftAP from the appropriate Wi-Fi settings screen. The end user 925 may then make the selection, which may be provided to the application on the onboarder device 920. In one embodiment, the message sequence 900B may then have the onboarder device 920 and the onboardee device 910 communicate in a similar manner as described above with respect to message sequence 900A until the onboarder device 920 establishes the session with the onboardee device 910 and engages with the services associated therewith if the appropriate onboarding interface is available.

In one embodiment, at the point that message sequence 900A would prompt the end user 925 to select the personal AP from a Wi-Fi scan list, which cannot be obtained through a programmatically-initiated Wi-Fi scan on the onboarder device 920, message sequence 900B may include additional communication flows in which the onboarder device 920 may use an onboardee-assisted Wi-Fi scan to obtain the Wi-Fi scan list. For example, in one embodiment, the onboarder device 920 may invoke an appropriate service method that instructs the onboardee device 910 to scan all Wi-Fi access points in proximity thereto, and the onboardee device 910 may subsequently return a Wi-Fi scan list that includes an array of SSIDs and any associated authentication types to the onboarder device 920, thereby completing the onboardee-assisted Wi-Fi scan. In one embodiment, message sequence 900B may then prompt the end user 925 to select the personal AP in the same manner as message sequence 900A and include subsequent communication flows that are substantially the same as those described above with respect to FIG. 9A.

Figure 10:
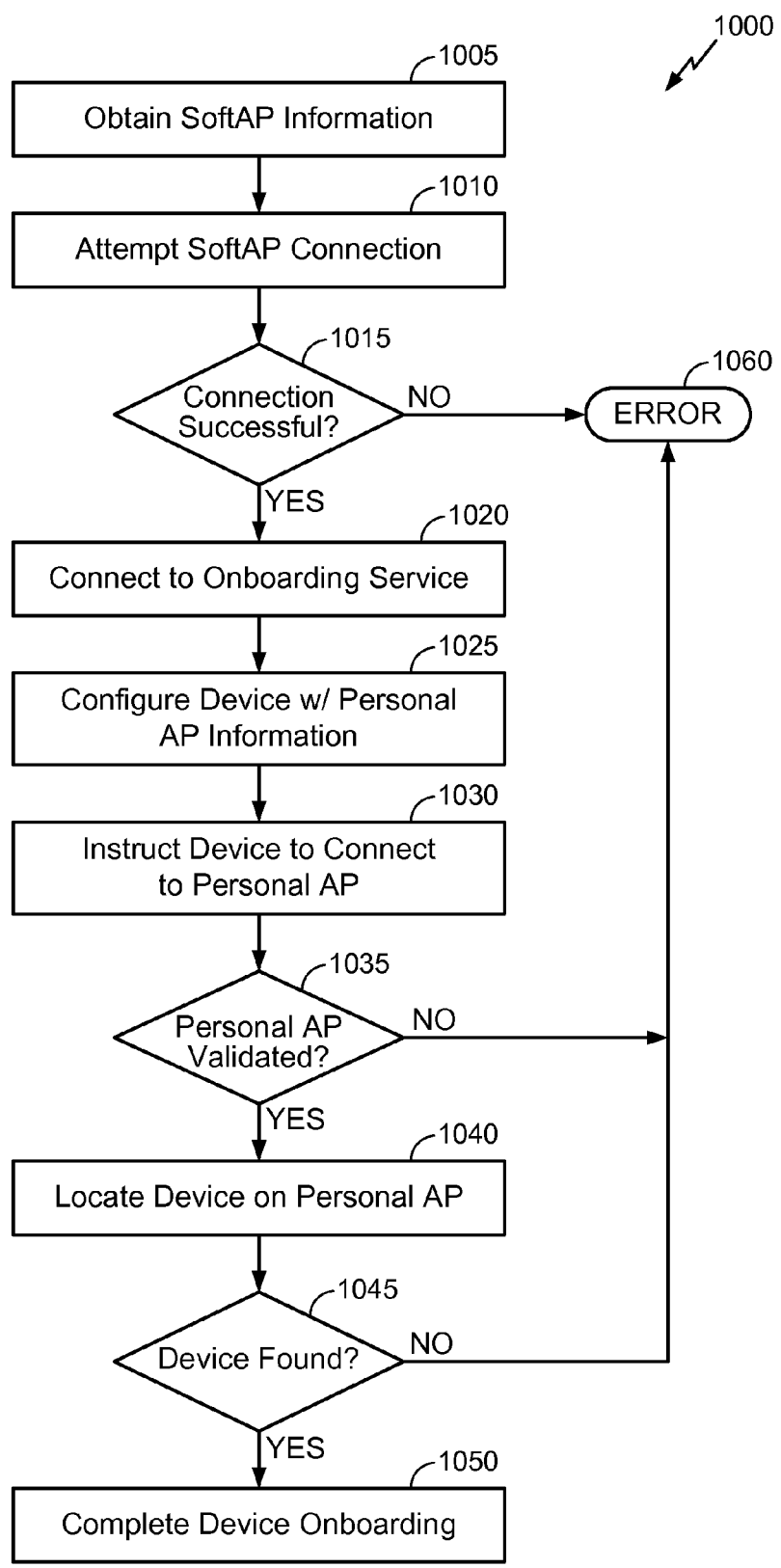
FIG. 10 illustrates an exemplary method in which an onboarder device may use discoverable P2P services to remotely onboard an onboardee device over a Wi-Fi network, in accordance with one aspect of the disclosure.

According to one aspect of the disclosure, FIG. 10 illustrates an exemplary method 1000 that the onboarder device may perform to use the discoverable P2P services to remotely onboard the onboardee device over the Wi-Fi network, wherein the onboardee device may correspond to a headless device. In particular, the onboarder device may initially obtain SoftAP information corresponding to the onboardee device attempting to join the personal Wi-Fi network at block 1005. For example, in one embodiment, block 1005 may include scanning a QR code with a camera on the onboarder device, in which case the SoftAP information may be obtained from the scanned QR code, or block 1005 may alternatively prompt the user to enter the SoftAP information, in which case the SoftAP information may be obtained from the user. In either case, in response to obtaining the SoftAP information, the onboarder device may then attempt to connect to the SoftAP that corresponds to the onboardee device (e.g., as a client) at block 1010. The onboarder device may then determine whether the attempted connection was successful at block 1015, wherein an error message may be generated at block 1060 in response to the onboarder device failing to connect to the SoftAP that corresponds to the onboardee device. Otherwise, in response to determining that the attempted connection was successful, the onboarder device may then search for and connect to the onboarding service at block 1020. Furthermore, in one embodiment, the onboarder device may configure the onboardee device with the personal AP information at block 1020 in response to successfully connecting to the SoftAP and the onboarding service. For example, in one embodiment, the onboarder device may transfer an SSID, authentication credentials (e.g., a passphrase), and/or an authentication type associated with the personal AP to the onboardee device to configure the onboardee device at block 1020, and the onboarder device may then instruct the onboardee device to connect to the personal AP at block 1030.

In one embodiment, the onboarder device may then determine whether the onboardee device attempting to connect to the personal AP was successfully validated at block 1035. For example, the onboardee device may generally perform a validation process in response to suitably receiving the personal AP configuration and validation information transferred at block 1025. As such, in response to determining at block 1035 that the onboardee device failed to successfully validate (e.g., because the onboardee device provided invalid authentication credentials or otherwise failed to provide valid configuration information), an error message may be returned at block 1060. Alternatively, if the onboardee device was successfully validated, the onboarder device may then attempt to locate the onboardee device on the personal AP at block 1040 and then determine whether the onboardee device was found on the personal AP at block 1045. In response to determining that the onboardee device could not be found on the personal AP, an error message to that effect may be generated at block 1060. Otherwise, in response to determining that the onboardee device was found on the personal AP at block 1045, the onboarder device may determine that the onboardee device was successfully onboarded to the Wi-Fi network and the onboarding process may end at block 1060.

Figure 11:
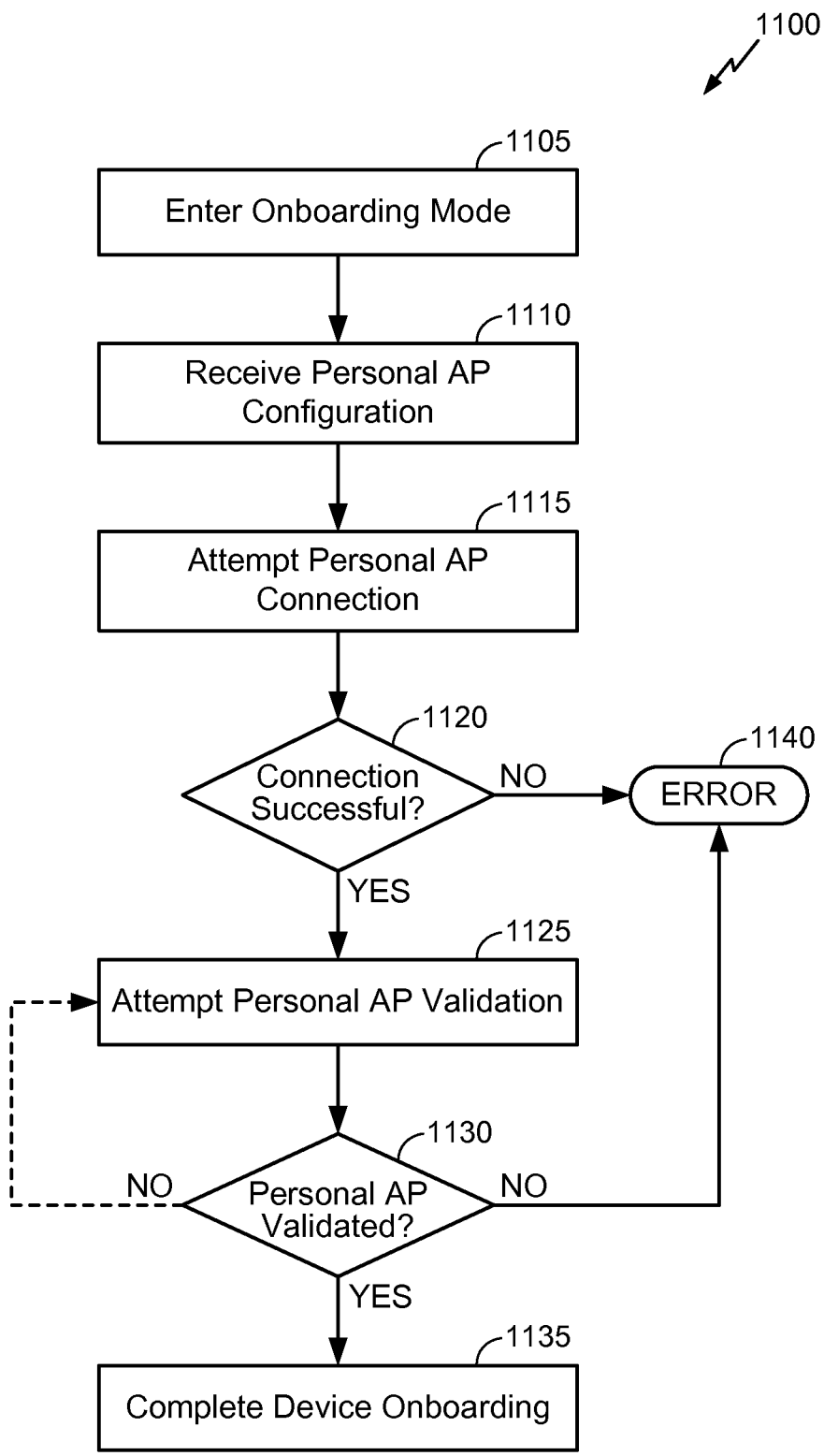
FIG. 11 illustrates an exemplary method in which an onboardee device may use discoverable P2P services to remotely onboard over a Wi-Fi network, in accordance with one aspect of the disclosure.

According to one aspect of the disclosure, FIG. 11 illustrates an exemplary method 1100 that the onboardee device may perform to use the discoverable P2P services to remotely onboard to the Wi-Fi network. For example, in one embodiment, the method 1100 may generally be performed during and/or in connection with the method 1000 shown in FIG. 10 where the onboarder device attempts to provision the onboardee device with configuration and credential information that the onboardee device can use to join the personal Wi-Fi network, which may occur when the onboardee device enters an onboarding mode at block 1105 (e.g., while in an offboarded mode, after being reset to factory settings, after losing connecting to the Wi-Fi network, etc.). Furthermore, the method 1100 may be performed while the SoftAP is available, which may depend on the configuration state associated with the onboardee device. For example, in one embodiment, the SoftAP may be available when the onboardee device has a configuration state in which the personal AP is not configured, the personal AP is configured but not validated, the personal AP is configured but an error has occurred, and/or the personal AP is configured and the onboardee device is retrying to connect to the personal AP (e.g., if the onboardee device has configured and been validated to the personal AP but fails to connect after a configurable number of delayed attempts, the onboardee device may transition to the retry state in which the SoftAP is enabled to allow the onboardee device to be reconfigured, and the onboardee device may then return to the configured and validated state and retry to connect with the personal AP after a timer expires).

In one embodiment, the personal AP may generally not be configured when the method 1100 begins, whereby the onboardee device may initially receive the personal AP configuration information at block 1110. For example, in one embodiment, block 1110 may include the onboardee device receiving a name (e.g., an SSID), authentication credentials (e.g., a passphrase), and/or an authentication type associated with the personal AP from the onboarder device. When the authentication type equals "any," the onboardee device may attempt one or more possible authentication types supported thereon to connect to the personal AP. In any case, the onboardee device may then attempt to connect to the personal AP using the received personal AP information at block 1115 and determine whether the attempted connection was successful at block 1120. In response to failing to connect to the personal AP, an error message may be generated at block 1140. Otherwise, in response to successfully connecting to the personal AP, the onboardee device may attempt to validate with the personal AP at block 1125 using mechanisms similar to those described in further detail above. In response to determining that the attempted validation failed at block 1130, the onboardee device may then attempt to retry the validating process a particular number of times at block 1125 before declaring that the passphrase and/or authentication type used at block 1125 is not valid. For example, the validating process may be retried at block 1125 a maximum number of times N, or the onboardee device may alternatively not perform the maximum number of retries if the reason for the failure is known. In any case, in response to failing to successfully validate, an appropriate error message may be generated at block 1140, or the onboarding process may be appropriately completed at block 1135 in response to successfully validating to the personal AP.

As IoT devices become increasingly widespread, users will interact with an ever greater number of IoT devices. Because of this, when a user receives an alert that an IoT device needs to be physically accessed, the user may have a difficult time identifying which physical IoT device needs to be accessed, even if the user knows the name and/or type of the device. For example, there may be three of the same kind of video projector in a room. The user may receive an alert that the bulb in "projector 2" needs to be replaced. If the projectors are named "projector 1," "projector 2," and "projector 3," for example, the user may not be able to easily identify which projector is "projector 2." Even if the projectors are labeled, the labels may not be immediately apparent, or they may not be visible without using a ladder.

As another example, the user may have forgotten where he or she installed a particular IoT device, such as a home security sensor. If the sensor alerts the user that it needs a new battery, for example, the user may not only have difficulty identifying which sensor is sending the alert, but also where the sensor is located.

To assist the user in quickly identifying a particular IoT device and its location, a user onboarding or configuring the IoT device can take a picture of the IoT device and transmit the image to the IoT device during or after the onboarding process. The IoT device can store the image, and when sending an alert and/or its About information to the user, it can also send the image. Seeing a picture of the IoT device in its environment will help the user quickly identify the IoT device and its location.

For example, during the onboarding process, described above with reference to FIGS. 8-11, if the user onboards the IoT device using a smartphone, a tablet computer, or some other device that has a camera, the user can take a picture of the onboardee IoT device with the onboarder device's camera and simply transmit the image to the onboardee IoT device during the onboarding process. If the onboarder device does not have a camera, or if the user does not take the picture with the onboarder device's camera, the user can take a picture of the onboardee IoT device with another camera device and transmit the image to the onboarder device, which can then transmit the image to the onboardee IoT device. If the IoT device can onboard itself, the user can take a picture of the IoT device with a different camera device, and may then transmit the image directly to the onboardee IoT device.

Similarly, if the user takes the picture during the configuration process, the user can take a picture of the IoT device with the configurator device's camera (if it has one) and simply transmit the image to the IoT device during configuration. If the configurator device does not have a camera, or if the user does not take the picture with the configurator device's camera, the user can take a picture of the IoT device with another camera device and transmit the image to the configurator device, which can then transmit the image to the IoT device. If the user can configure the IoT device using the IoT device's user interface, the user can take a picture of the IoT device with a different camera device, and may then transmit the image directly to the IoT device.

The user should take the picture of the IoT device after installing or positioning it in its final location. In this way, the image of the IoT device will show the IoT device in its environment, which will help the user to quickly identify the IoT device.

The onboarder or configurator device can prompt the user to take the picture of the IoT device during the onboarding or configuration process. Alternatively, the IoT device may send a message to the onboarder or configurator device instructing it to alert the user to take the picture. The prompt may be displayed on the user interface of the onboarder or configurator device. The prompt may instruct the user to take a picture of the IoT device in its final location and allow the user to switch to the onboarder or configurator device's camera application.

Alternatively, if the onboarder or configurator device does not have a camera, the prompt may allow the user to select an image of the IoT device from the onboarder or configurator device's local memory. The user can then, or may have already, take the picture of the IoT device with another camera device and transmit the image to the onboarder or configurator device. The prompt may also instruct the user to include at least a portion of the environment around the IoT device in the picture for ease of future identification.

Although the forgoing was described in terms of a single prompt, it is apparent that there may be multiple prompts displayed to the user as the onboarder or configurator device performs the described process.

If the IoT device is later moved to another location, the user can take another picture of the IoT device at the new location. The user can launch the onboarding or configuration application and associate a new picture with the IoT device. The onboarding or configuration application may permit the user to take a new picture with the onboarder or configurator device's camera, or select an image from the onboarder or configurator device's local memory.

The IoT device may be aware that it has been moved, for example, by detecting a change in its GPS coordinates, and/or an acceleration above a threshold and/or for longer than a threshold period of time. In that case, the IoT device can alert the user that it has moved, either directly (e.g., by sending a message to the user's smartphone), or via the onboarder or configurator device. In response, the user can reconfigure or re-onboard the IoT device with a new picture, as discussed above, or the onboarder or configurator device can launch the onboarding or configuration application and prompt the user to take a new picture of the IoT device.

Figure 12:
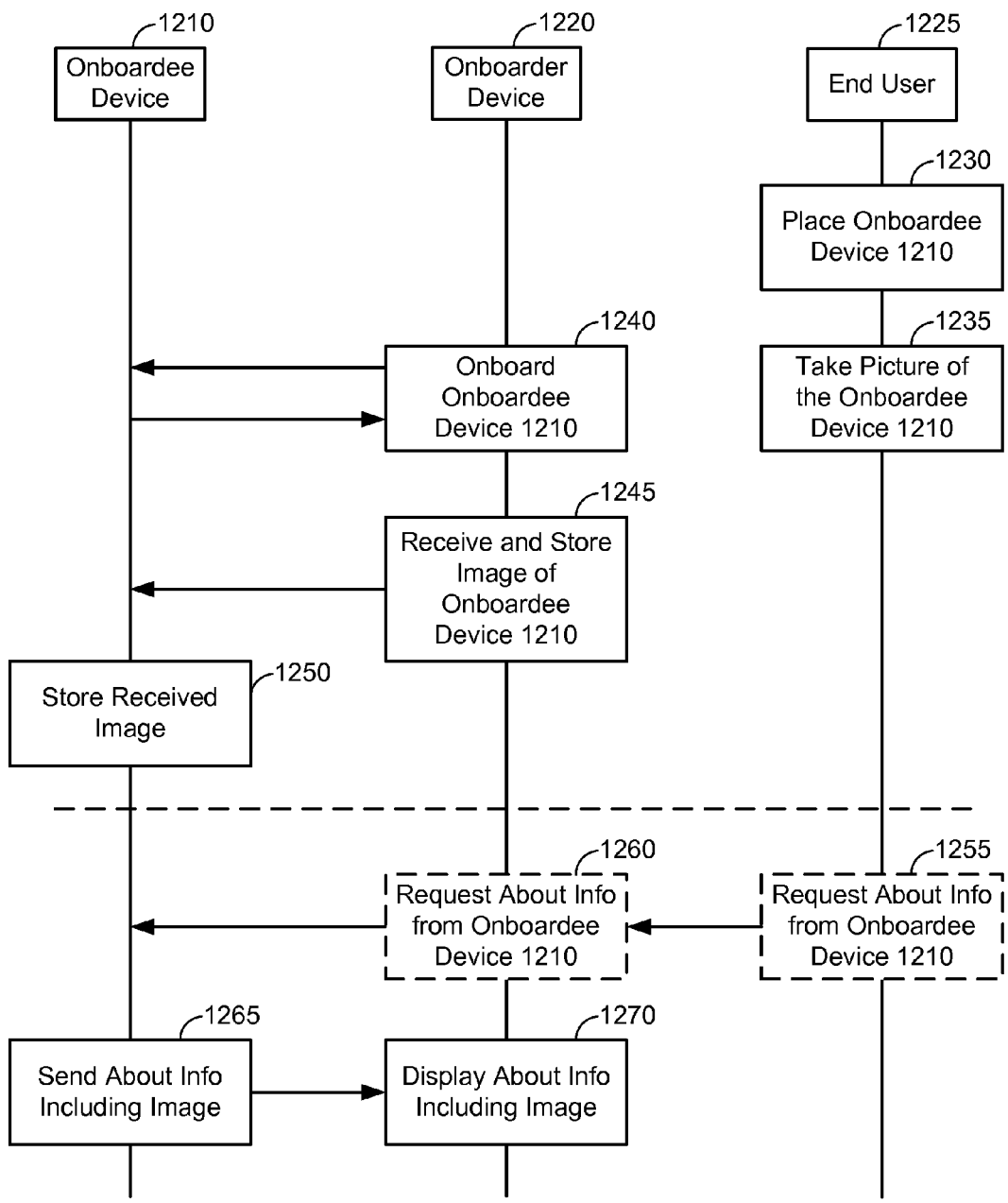
FIG. 12 illustrates an exemplary flow for identifying an onboardee device with an image of the onboardee device.

FIG. 12 illustrates an exemplary flow for identifying an onboardee device 1210 with an image of the onboardee device 1210 according to an embodiment of the disclosure. The onboardee device 1210 may be any IoT device, such as IoT device 200A in FIG. 2A or IoT device 200B in FIG. 2B, or any onboardee device, such as onboardee device 810 in FIG. 8. The flow shown in FIG. 12 is illustrated as occurring during the onboarding process. As is apparent, however, the flow illustrated in FIG. 12 could be performed during the configuration process instead of the onboarding process.

At 1230, the end user 1225 places the onboardee device 1210 in its final location. The term "final" does not mean that the onboardee device 1210 cannot be moved again, but rather indicates that the location is the location at which the end user 1225 wishes the onboardee device 1210 to be located once onboarded/configured. For example, the "final" location of a video projector may be mounted to the ceiling of a particular room.

At 1235, the end user 1225 takes a picture of the onboardee device 1210 after placing the onboardee device 1210 in its final location. The image of the onboardee device 1210 should include at least a portion of the environment in which the onboardee device 1210 is located. The end user 1225 may take the picture using a camera application on the onboarder device 1220, or a camera application on another device, in which case the end user 1225 transfers the image to the onboarder device 1220.

At 1240, the onboarder device 1220 onboards the onboardee device 1210, as discussed above with reference to FIGS. 8-11. The onboarder device 1220 may be an IoT device, such as IoT device 200B in FIG. 2B, or any onboarder device, such as onboarder device 820 in FIG. 8. For example, the onboarder device 1220 may be the user's smartphone, tablet computer, laptop computer, or the like.

At 1245, the onboarder device 1220 receives and stores an image of the onboardee device 1210. As discussed above, the onboarder device 1220 may receive and store an image of the onboardee device 1210 when the user takes a picture of the onboardee device 1210 with the camera application on the onboarder device 1220. Alternatively, the onboarder device 1220 may receive the image from another device with a camera and store the image in local memory. Although illustrated as separate blocks, block 1245 may be performed during the onboarding process of block 1240.

At 1250, the onboardee device 1210 receives and stores the image of itself.

At some later point in time, as indicated by the horizontal dashed line, the end user 1225, or another user, optionally requests About information from the onboardee device 1210 (block 1255). At 1260, the onboarder device 1220 optionally sends a request for About information to the onboardee device 1210. Although FIG. 12 illustrates the onboarder device 1220 sending the request for the About information, the end user 1225 may send the request using any device that can communicate with the onboardee device 1210.

At 1265, the onboardee device 1210 receives the request and sends the About information, including the image of itself, to the onboarder device 1220. At 1270, the onboarder device 1220 displays the About information, including the image of the onboardee device 1210.

Although FIG. 12 illustrates the onboarder device 1220 displaying the About information and the image in response to the request from the end user 1225, the onboarder device 1220 may instead display the About information and image upon receiving an alert from the onboardee device 1210. As such, blocks 1255 and 1260 are optional and the sending in block 1265 may be the sending of an alert that includes the About information and image.

Figure 13:
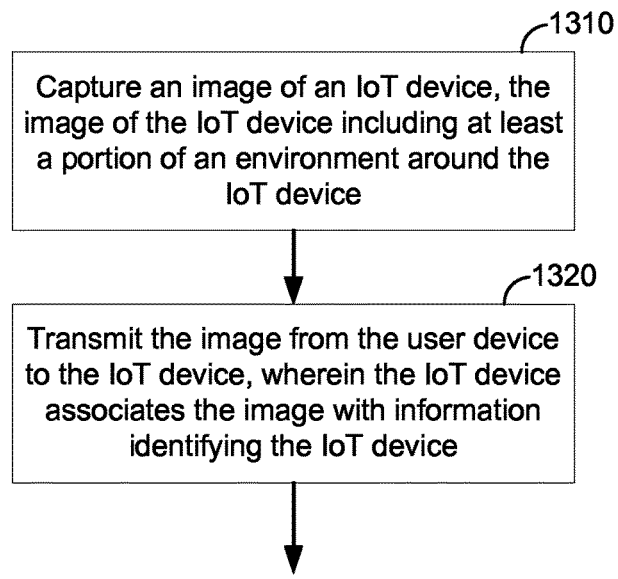
FIGS. 13-14 illustrate exemplary flows for identifying an IoT device with an image of the IoT device according to an aspect of the disclosure.

FIG. 13 illustrates an exemplary flow for identifying an IoT device with an image of the IoT device. The flow illustrated in FIG. 13 may be performed by any user device capable of capturing or receiving an image, such as IoT device 200A in FIG. 2A or onboarder device 1220 in FIG. 12. At 1310, the user device captures the image of the IoT device, as discussed above with reference to 1245 of FIG. 12. As discussed above, the image of the IoT device may include at least a portion of an environment around the IoT device. At 1320, the user device transmits the image from the user device to the IoT device, as discussed above with reference to 1245 of FIG. 12. The IoT device may associate the image with information identifying the IoT device, as discussed above with reference to 1250 of FIG. 12.

Figure 14:
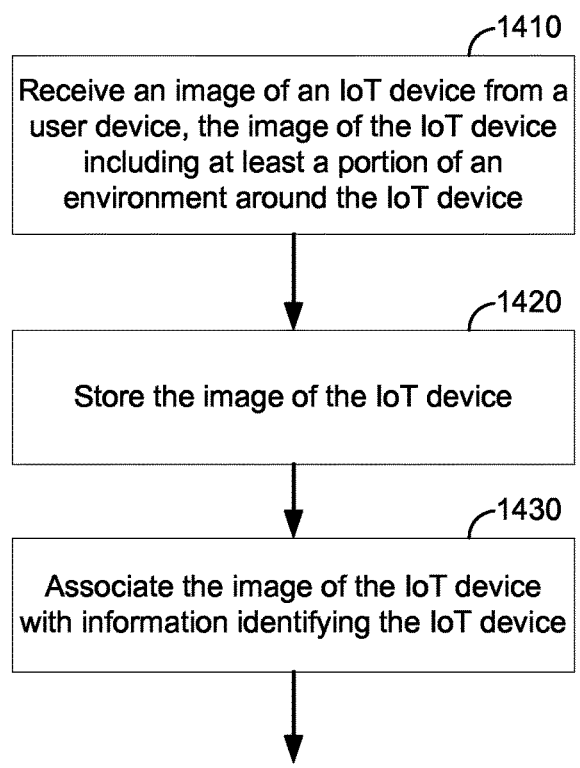

FIG. 14 illustrates an exemplary flow for identifying an IoT device with an image of the IoT device. The flow illustrated in FIG. 14 may be performed by any IoT device capable of receiving and storing an image, such as IoT device 200A200B in FIG. 2A/2B or onboardee device 1210 in FIG. 12. At 1410, the IoT device receives the image of the IoT device from another user device, such as IoT device 200A in FIG. 2A or onboarder device 1220 in FIG. 12, as discussed above with reference to 1250 of FIG. 12. As discussed above the image of the IoT device may include at least a portion of an environment around the IoT device. At 1420, the IoT device stores the image of the IoT device, as discussed above with reference to 1250 of FIG. 12. At 1430, the IoT device associates the image of the IoT device with information identifying the IoT device, as discussed above with reference to 1250 of FIG. 12.

Figure 15:
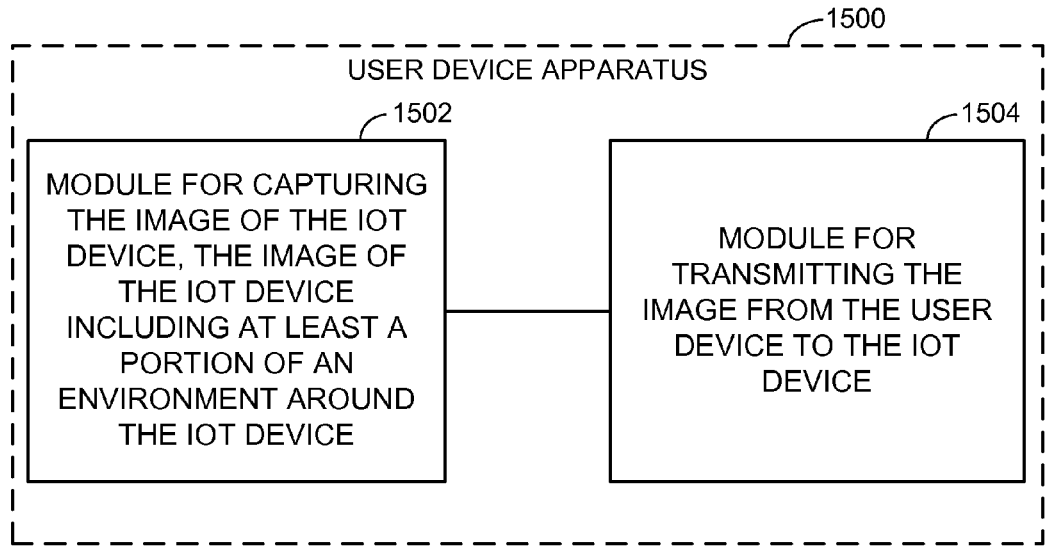
FIGS. 15-16 are simplified block diagrams of several sample aspects of apparatuses configured to support communication as taught herein.
Figure 16:
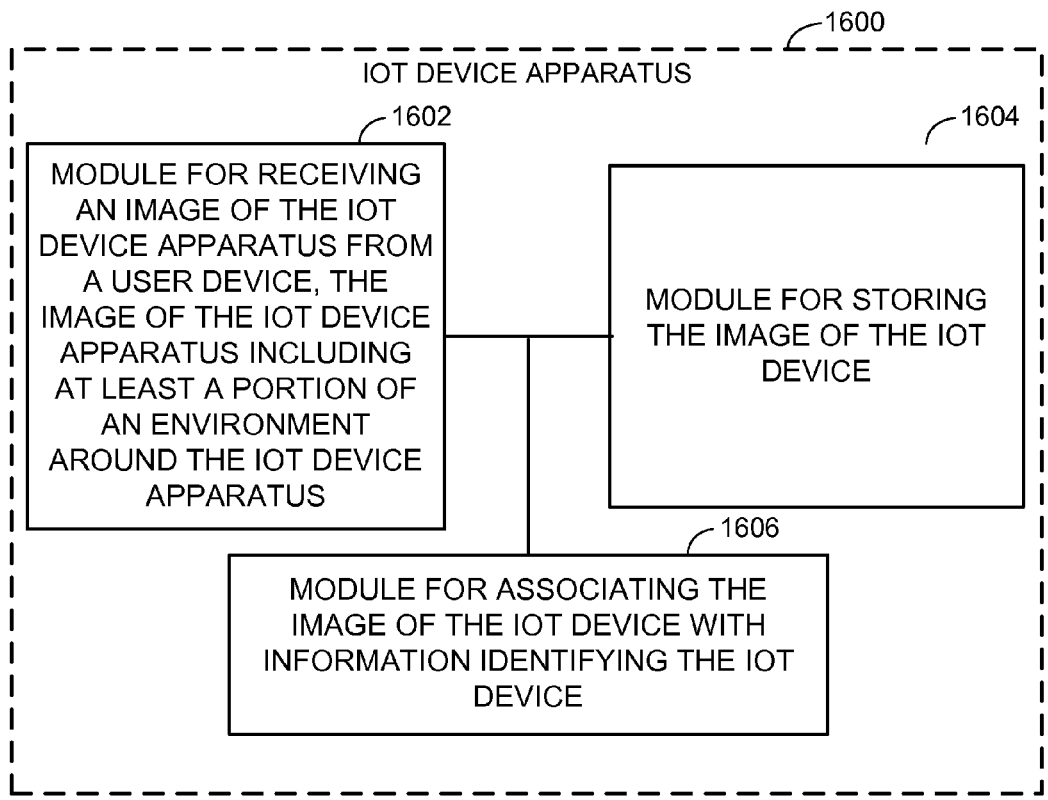

FIG. 15 illustrates an example user device apparatus 1500 represented as a series of interrelated functional modules. A module for capturing 1502 may correspond at least in some aspects to, for example, a camera or transceiver, such as camera 210 or transceiver 206 in FIG. 2A, as discussed herein. A module for transmitting 1504 may correspond at least in some aspects to, for example, a transceiver, such as transceiver 206 in FIG. 2A, as discussed herein FIG. 16 illustrates an example IoT device apparatus 1600 represented as a series of interrelated functional modules. A module for receiving 1602 may correspond at least in some aspects to, for example, a transceiver, such as transceiver 206 in FIG. 2A/2B, as discussed herein. A module for storing 1604 may correspond at least in some aspects to, for example, a memory, such as memory 212 in FIG. 2A, as discussed herein. A module for associating 1606 may correspond at least in some aspects to, for example, a memory and/or a processor, such as memory 212 and/or processor 208 in FIG. 2A, as discussed herein.

The functionality of the modules of FIGS. 15-16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 15-16, as well as other components and functions described herein, may be implemented using any suitable means. Such means also may be implemented, at least in part, using corresponding structure as taught herein. For example, the components described above in conjunction with the "module for" components of FIGS. 15-16 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for identifying an Internet of Things (IoT) device with an image of the IoT device, comprising:
    capturing, by a user device, the image of the IoT device, wherein the image of the IoT device includes at least a portion of an environment around the IoT device; and
    transmitting the image of the IoT device from the user device to the IoT device, wherein the IoT device stores the image of the IoT device in a memory of the IoT device and associates the image of the IoT device stored in the memory of the IoT device with information identifying the IoT device stored in the memory of the IoT device.

2. The method of claim 1, further comprising:
    connecting the user device to the IoT device, wherein the transmitting is performed in response to the connecting.

3. The method of claim 2, wherein the connecting is performed during an onboarding process of the IoT device.

4. The method of claim 1, wherein a user of the IoT device instructs the user device to capture the image of the IoT device during an onboarding process of the IoT device.

5. The method of claim 1, wherein a user of the IoT device instructs the user device to capture the image of the IoT device during a configuration process of the IoT device.

6. The method of claim 1, wherein the transmitting comprises transmitting the image to the IoT device via an onboarder device.

7. The method of claim 1, further comprising:
    receiving, at the user device, an alert from the IoT device;
    receiving the image of the IoT device from the IoT device; and
    displaying the image at the user device.

8. The method of claim 7, further comprising:
    requesting the image of the IoT device in response to receiving the alert.

9. The method of claim 1, further comprising:
    receiving, by the user device, a request from a user for information about the IoT device; and
    forwarding the request to the IoT device.

10. The method of claim 9, further comprising:
receiving information about the IoT device and the image of the IoT device from the IoT device; and
displaying the information about the IoT device and the image.

11. A method for identifying an Internet of Things (IoT) device with an image of the IoT device, comprising:
receiving, by the IoT device, the image of the IoT device from a user device, wherein the image of the IoT device includes at least a portion of an environment around the IoT device;
storing, by the IoT device, the image of the IoT device in a memory of the IoT device; and
associating, by the IoT device, the image of the IoT device stored in the memory of the IoT device with information identifying the IoT device stored in the memory of the IoT device.

12. The method of claim 11, wherein the IoT device receives the image of the IoT device during an onboarding process of the IoT device.

13. The method of claim 12, wherein the user device onboards the IoT device.

14. The method of claim 11, wherein the IoT device receives the image of the IoT device during a configuration process of the IoT device.

15. The method of claim 14, wherein the user device configures the IoT device.

16. The method of claim 11, further comprising:
sending, by the IoT device, an alert to the user device; and
sending, by the IoT device, the image of the IoT device to the user device.

17. The method of claim 11, further comprising:
receiving, by the IoT device, a request from the user device for information about the IoT device; and
sending, by the IoT device, information about the IoT device and the image of the IoT device to the user device.

18. The method of claim 11, wherein the user device comprises a smartphone, a tablet computer, a laptop computer, a personal digital assistant (PDA), or a desktop computer.

19. The method of claim 11, wherein the IoT device comprises a headless IoT device.

20. An apparatus for identifying an Internet of Things (IoT) device with an image of the IoT device, comprising:
a camera of a user device configured to capture the image of the IoT device, wherein the image of the IoT device includes at least a portion of an environment around the IoT device; and
a transceiver of the user device configured to transmit the image of the IoT device from the user device to the IoT device, wherein the IoT device stores the image of the IoT device in a memory of the IoT device and associates the image stored in the memory of the IoT device with information identifying the IoT device stored in the memory of the IoT device.

21. The apparatus of claim 20, wherein the transceiver being configured to transmit comprises the transceiver being configured to transmit the image to the IoT device via an onboarder device.

22. The apparatus of claim 20, wherein the transceiver is further configured to:
receive an alert from the IoT device; and
receive the image of the IoT device from the IoT device;
the apparatus further comprising:
a user interface of the user device configured to display the image.

23. The apparatus of claim 20, wherein the transceiver is further configured to:
receive a request from a user for information about the IoT device; and
forward the request to the IoT device.

24. The apparatus of claim 23, wherein the transceiver is further configured to receive information about the IoT device and the image of the IoT device from the IoT device;
the apparatus further comprising:
a user interface of the user device configured to display the information about the IoT device and the image.

25. An apparatus for identifying an Internet of Things (IoT) device with an image of the IoT device, comprising:
a transceiver of the IoT device configured to receive the image of the IoT device from a user device, wherein the image of the IoT device includes at least a portion of an environment around the IoT device;
a memory of the IoT device configured to store the image of the IoT device; and
at least one processor of the IoT device configured to associate the image of the IoT device stored in the memory of the IoT device with information identifying the IoT device stored in the memory of the IoT device.

26. The apparatus of claim 25, wherein the transceiver receives the image of the IoT device during an onboarding process of the IoT device.

27. The apparatus of claim 25, wherein the transceiver receives the image of the IoT device during a configuration process of the IoT device.

28. The apparatus of claim 25, wherein the transceiver is further configured to:
send an alert to the user device; and
send the image of the IoT device to the user device.

29. The apparatus of claim 25, wherein the transceiver is further configured to:
receive a request from the user device for information about the IoT device; and
send information about the IoT device and the image of the IoT device to the user device.

30. The apparatus of claim 25, wherein the IoT device comprises a headless IoT device.

* * * * *